US011095233B2

(12) United States Patent
Nabeshi

(10) Patent No.: US 11,095,233 B2
(45) Date of Patent: Aug. 17, 2021

(54) ELECTRIC POWER CONVERSION APPARATUS, MOTOR DRIVE UNIT AND ELECTRIC MOTION POWER STEERING APPARATUS

(71) Applicant: Nidec Corporation, Kyoto (JP)

(72) Inventor: Kaori Nabeshi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/497,623

(22) PCT Filed: Mar. 6, 2018

(86) PCT No.: PCT/JP2018/008529
§ 371 (c)(1),
(2) Date: Sep. 25, 2019

(87) PCT Pub. No.: WO2018/180274
PCT Pub. Date: Oct. 4, 2018

(65) Prior Publication Data
US 2020/0021205 A1    Jan. 16, 2020

(30) Foreign Application Priority Data
Mar. 31, 2017    (JP) ............................. JP2017-070711

(51) Int. Cl.
| H02M 7/493 | (2007.01) |
| B60R 16/03 | (2006.01) |
| B62D 5/04 | (2006.01) |
| H02M 7/5387 | (2007.01) |
| H02M 7/5395 | (2006.01) |
| H02P 27/06 | (2006.01) |

(52) U.S. Cl.
CPC ............ *H02M 7/493* (2013.01); *B60R 16/03* (2013.01); *B62D 5/04* (2013.01); *H02M 7/5387* (2013.01); *H02M 7/5395* (2013.01); *H02P 27/06* (2013.01)

(58) Field of Classification Search
None
See application file for complete search history.

(56) References Cited

U.S. PATENT DOCUMENTS

| 2014/0184115 A1* | 7/2014 | Thomsen .................. H02P 6/28 |
| | | 318/400.06 |
| 2014/0198534 A1* | 7/2014 | Jovcic ............... H02M 3/33584 |
| | | 363/16 |
| 2015/0349662 A1* | 12/2015 | Jiang ..................... H02M 7/493 |
| | | 363/71 |
| 2019/0097522 A1* | 3/2019 | Wada ................ H02M 7/53871 |

FOREIGN PATENT DOCUMENTS

JP    2014-192950 A    10/2014

* cited by examiner

*Primary Examiner* — Jeffrey A Gblende
*Assistant Examiner* — Henry E Lee, III
(74) *Attorney, Agent, or Firm* — Keating & Bennett

(57) ABSTRACT

An electric power conversion apparatus includes a first inverter electrically connected to one end of each of phase windings of a motor, and a second inverter electrically connected to the other end of each of the phase windings, and a neutral point potential setting circuit electrically connected to the first inverter to set a potential of a neutral point in the first inverter when the first inverter is determined to be in an abnormal state.

18 Claims, 22 Drawing Sheets

ELECTRIC POWER CONVERSION APPARATUS, MOTOR DRIVE UNIT AND ELECTRIC MOTION POWER STEERING APPARATUS

CROSS REFERENCE TO RELATED APPLICATIONS

This is a U.S. national stage of PCT Application No. PCT/JP2018/008529, filed on Mar. 6, 2018, and priority under 35 U.S.C. § 119(a) and 35 U.S.C. § 365(b) is claimed from Japanese Application No. 2017-070711, filed Mar. 31, 2017; the entire disclosures of each application are hereby incorporated herein by reference.

1. FIELD OF THE INVENTION

This disclosure relates to an electric power conversion apparatus to convert an electric power from a power source into an electric power supplied to an electric motion motor, a motor drive unit and an electric motion power steering apparatus.

2. BACKGROUND

An electric motion motor (hereinafter, simply referred to as "motor"), such as a brushless DC motor and an AC synchronous motor, is typically driven by a three-phase current. Complex control technology, such as vector control, is used to accurately control the waveform of the three-phase current. Such control technology requires highly mathematical arithmetic and uses digital arithmetic circuits such as microcontrollers. Vector control technology has been utilized in application in which a load variation of the motor is large, for example, in fields of washing machines, electric assist bicycles, electric scooters, electric motion power steering apparatuses, electric vehicles, industrial equipment, and the like.

In an automotive mounting field, an electrical control unit (ECU) for automobiles is used for vehicles. The ECU includes a microcontroller, a power source, an input/output circuit, an A/D converter, a load drive circuit, a ROM (Read Only Memory), and the like. An electronic control system is constructed with the ECU as a core. For example, the ECU controls an actuator such as a motor by processing signals from a sensor. Specifically, the ECU controls an inverter in an electric power conversion apparatus while monitoring rotational speed and torque of the motor. Under control by the ECU, the electric power conversion apparatus converts a drive power supplied to the motor.

Recently, an electromechanical integrated motor in which a motor, an electric power conversion apparatus, and an ECU are integrated has been developed. Particularly in the automotive mounting field, a high quality assurance is required from viewpoint of safety. For this reason, a redundant design has been introduced which can continue a safe operation even when a part of a component is faulty. As an example of a redundant design, it has been considered to provide two electric power conversion apparatuses for one motor. As another example, it has been considered to provide a backup microcontroller in a main microcontroller.

For example, a related art discloses an electric power conversion apparatus including a control unit and two inverters, and converting a power supplied to a three-phase motor. Each of the two inverters is connected to a power source and a ground (hereinafter, referred to as "GND"). An inverter of one side is connected to one end of the three-phase winding of the motor, and an inverter of the other side is connected to the other end of the three-phase winding. Each inverter has a bridge circuit composed of three legs, each leg including a high-side switching element and a low-side switching element. When a fault of the switching elements in the two inverters is detected, the control unit switches a motor control from a control in normal state to a control in abnormal state. In the present specification, "abnormal" mainly means a fault of a switching element. Also, "Control in normal state" means a control in a state in which all the switching elements are normal, and "control in abnormal state" means a control in a state in which a fault occurs in a certain switching element.

In the control in abnormal state, a neutral point of the winding is configured by turning on and off the switching element according to a predetermined rule in the inverter (hereinafter referred to as a "faulty inverter") including a faulty switching element among the two inverters. According to the rule, for example, when an event of an open-fault in which the high-side switching element is always off, those other than the faulty switching element among the three high-side switching elements will be off, and the three low-side switching elements will be on, in the bridge circuit of the invertor. In this case, the neutral point is configured in the low-side side. Also, when an event of a short-fault in which the high-side switching element is always on, those other than the faulty switching element among the three high-side switching elements will be on, and the three low-side switching devices will be off, in the bridge circuit of the inverter. In this case, the neutral point is configured in the high-side side. According to the electric power conversion apparatus of the related art, in abnormal state, the neutral point of the three-phase winding is configured in the faulty inverter. Even if a fault occurs in the switching element, the motor drive can be continued by using the inverter of normal side.

In the conventional art as described above, further improvement of a current control is required in normal state and in abnormal state.

SUMMARY

Example embodiments of the present disclosure provide electric power conversion apparatuses each capable of performing appropriate a current control in both in normal state and in an abnormal state.

An example electric power conversion apparatus of the present disclosure is an electric power conversion apparatus that converts electric power from a power source into an electric power supplied to a motor having n-phase (where n is an integer greater than or equal to 3) windings. The electric power conversion apparatus includes a first inverter electrically connected to one end of each of the phase windings of the motor, a second inverter electrically connected to another end of each of the phase windings of the motor, and a first neutral point potential setting circuit electrically connected to the first inverter and setting a potential of a neutral point of the first inverter when the first inverter is determined to be in an abnormal state.

The above and other elements, features, steps, characteristics and advantages of the present disclosure will become more apparent from the following detailed description of the example embodiments with reference to the attached drawings.

DETAILED DESCRIPTION

Before describing example embodiments of the present disclosure, the inventor's knowledge that is the basis of the present disclosure will be described.

In an electric power conversion apparatus of the related art, a power source and the GND are always connected to each of two inverters. The inventor of the present application has found a problem that even if a neutral point is configured in a high-side of a faulty inverter in abnormal state, a power loss in the faulty inverter increases because a power source voltage is supplied to the neutral point. Further, the inventor of the present application has found a problem that even if a neutral point is configured in a low-side of the faulty inverter in abnormal state, a current supplied to each phase winding through an inverter of a normal side does not return to an inverter of a supply source, but flows from the faulty inverter to the GND. There is a need for an electric power conversion apparatus capable of suppressing the power loss and performing appropriately a current control both in normal state and in abnormal state.

Below, with reference to accompanying drawings, example embodiments of an electric power conversion apparatus, a motor drive unit, and an electric motion power steering apparatus of the present disclosure will be described in detail. However, a detailed description than necessary may be omitted. For example, detailed descriptions of already well-known items and duplicate descriptions of substantially the same configuration may be omitted. This is to avoid unnecessarily redundant description and to facilitate understanding by those skilled in the art.

In this specification, an example embodiment of the present disclosure will be described by taking as an exemplary electric power conversion apparatus converting an electric power to be supplied to a three-phase motor having three phases (U-phase, V-phase, and W-phase) windings. However, for example, an electric power conversion apparatus converting an electric power to be supplied to a n-phase motor having n-phase (where n is an integer greater than or equal to 3) windings such as four-phase and five-phase is also within the scope of the present disclosure.

Figure 1:
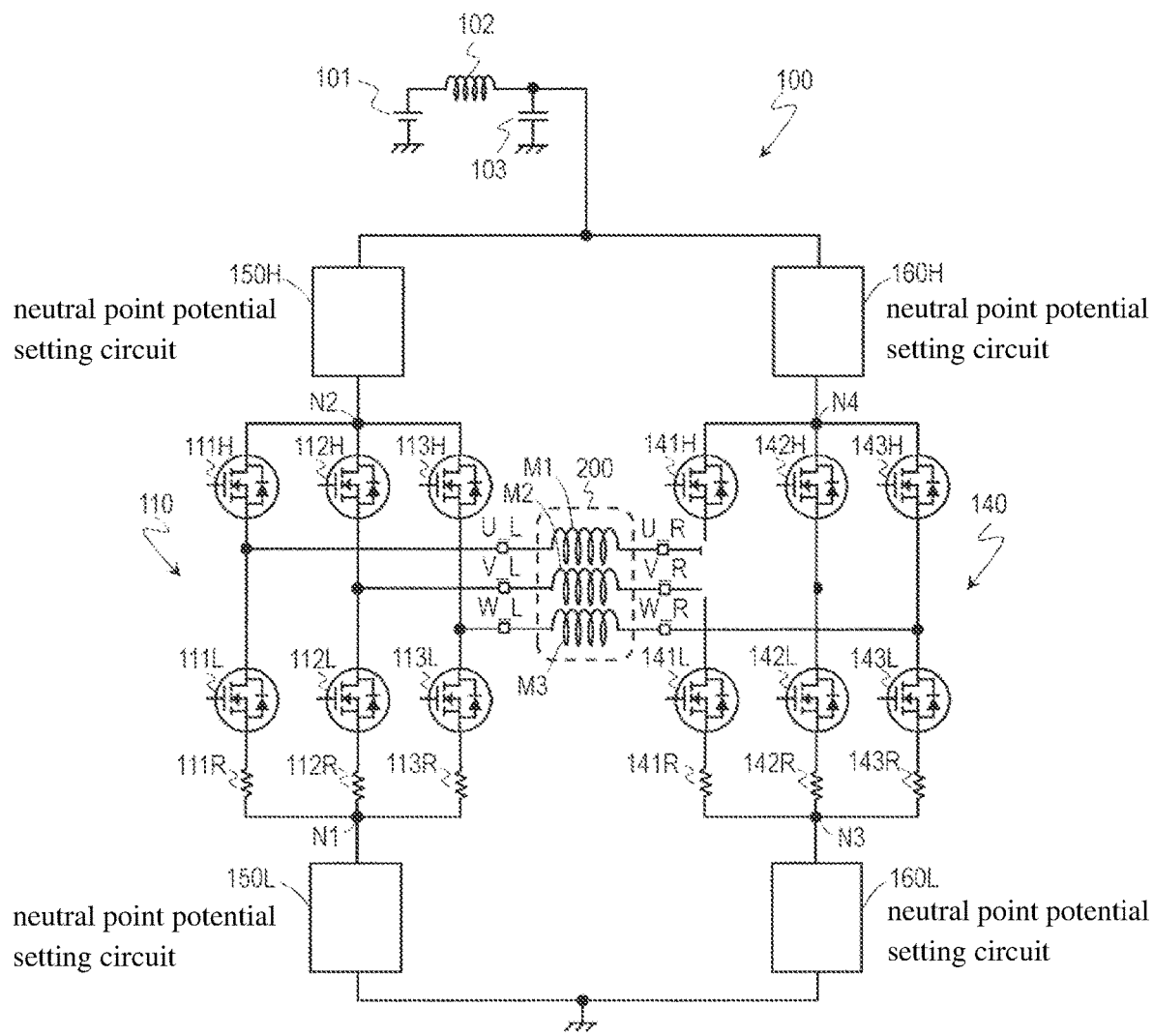
FIG. 1 is a mimetic diagram showing a circuit configuration of an electric power conversion apparatus according to an example embodiment of the present disclosure.

FIG. 1 mimetically shows a circuit configuration of an electric power conversion apparatus 100 according to the present example embodiment.

The electric power conversion apparatus 100 includes a first inverter 110, a second inverter 140, and neutral point potential setting circuits 150L, 150H, 160L, and 160H. Further, the electric power conversion apparatus 100 includes a control circuit 300 shown in FIG. 6. The electric power conversion apparatus 100 may convert an electric power supplied to various motors. The motor 200 is, for example, a three-phase alternative current (AC) motor.

The motor 200 includes a U-phase winding M1, a V-phase winding M2, and a W-phase winding M3, and is connected to the first inverter 110 and the second inverter 140. Specifically, the first inverter 110 is connected to one end of each of the phase windings of the motor 200, and the second inverter 140 is connected to the other end of each of the phase windings. In the present specification, "connection" between parts (components) mainly means an electrical connection.

The first inverter 110 has terminals U_L, V_L, and W_L corresponding to each phase, and the second inverter 140 has terminals U_R, V_R, and W_R corresponding to each phase.

The terminal U_L of the first inverter 110 is connected to one end of the U-phase winding M1, the terminal V_L is connected to one end of the V-phase winding M2, and the terminal W_L is connected to one end of the W-phase winding M3. Similar to the first inverter 110, the terminal U_R of the second inverter 140 is connected to the other end of the U-phase winding M1, the terminal V_R is connected to the other end of the V-phase winding M2, and the terminal W_R is connected to the other end of the W-phase winding M3. Such connections are different from so-called a star connection and a delta connection.

The neutral point potential setting circuit 150L is connected between the first inverter 110 and a GND. The neutral point potential setting circuit 150H is connected between the first inverter 110 and the power source 101. The neutral point potential setting circuit 160L is connected between the second inverter 140 and the GND. The neutral point potential setting circuit 160H is connected between the second inverter 140 and the power source 101. As will be described in detail later, the neutral point potential setting circuits 150L and 150H set a potential of the neutral point configured in the first inverter 110 when the first inverter 100 is in abnormal state. Also, the neutral point potential setting circuits 160L and 160H set a potential of the neutral point configured in the second inverter 140 when the second inverter 140 is abnormal state.

In the electric power converter 100, the first inverter 110 and the second inverter 140 are connected to the power source 101 and the GND through the neutral point potential setting circuits 150L, 150H, 160L, and 160H.

In this specification, the first inverter 110 may be referred to as a "bridge circuit L". Also, the second inverter 140 may be referred to as a "bridge circuit R". Each of the first inverter 110 and the second inverter 140 has three legs including a low-side switching element and a high-side switching element. The plurality of switching elements composing the legs compose a plurality of H bridges between the first inverter 110 and the second inverter 140 through windings of an electric motion motor 200.

The first inverter 110 includes a bridge circuit composed of three legs. Switching elements 111L, 112L, and 113L shown in FIG. 1 are low-side switching elements, and switching elements 111H, 112H, and 113H are high-side switching elements. For example, a field-effect transistor (typically a MOSFET) or an insulated-gate bipolar transistor (IGBT) may be used as the switching elements. In this specification, an example in which a FET is used as a switching element of an inverter is described, and in the following description, the switching element is sometimes referred to as an FET. For example, the switching element 111L is denoted as a FET 111L.

The first inverter 110 has three shunt resistors 111R, 112R, and 113R as current sensors (see FIG. 6) for detecting currents flowing in the windings of each of the U-phase, the V-phase, and the W-phase. A current sensor 170 includes a current detection circuit (not shown) for detecting a current flowing through each shunt resistor. For example, the shunt resistors 111R, 112R, and 113R are connected between the three low-side switching elements included in the three legs of the first inverter 110 and the GND, respectively. Specifically, the shunt resistor 111R is connected between the FET 111L and the neutral point potential setting circuit 150L, the shunt resistor 112R is connected between the FET 112L and the neutral point potential setting circuit 150L, and the shunt resistor 113R is connected between the FET 113L and the neutral point potential setting circuit 150L. A resistance value of the shunt resistor is, for example, about 0.5 mΩ to 1.0 mΩ.

Similar to the first inverter 110, the second inverter 140 includes a bridge circuit composed of three legs. FETs 141L, 142L and 143L shown in FIG. 1 are low-side switching elements, FETs 141H, 142H and 143H are high-side switching elements. Also, the second inverter 140 has three shunt resistors 141R, 142R, and 143R. The shunt resistors are connected between the three low-side switching elements included in the three legs and the GND. Each FET of the first and second inverters 110, 140 may be controlled by, for example, a microcontroller or a dedicated driver.

Figure 2:
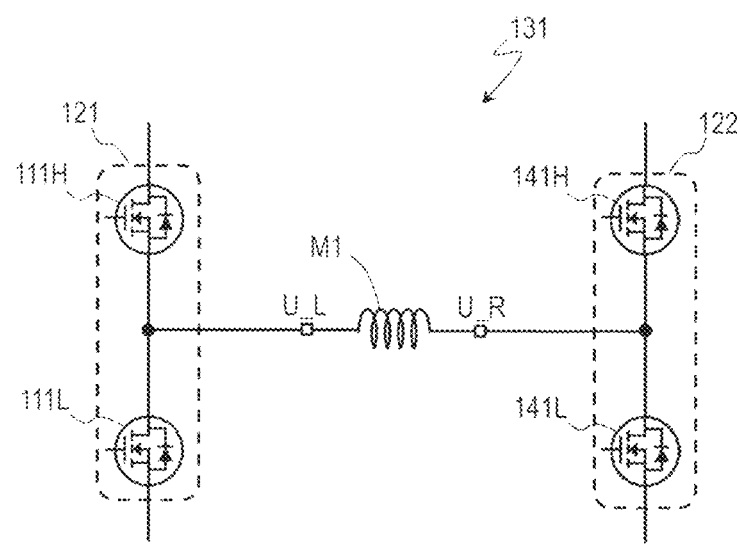
FIG. 2 is a diagram showing an H-bridge included in an electric power conversion apparatus according to an example embodiment of the present disclosure.
Figure 3:
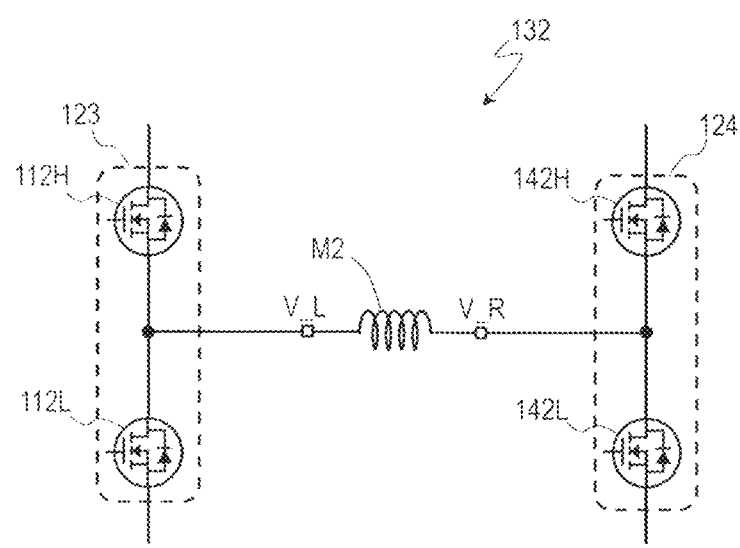
FIG. 3 is a diagram showing an H-bridge included in an electric power conversion apparatus according to an example embodiment of the present disclosure.
Figure 4:
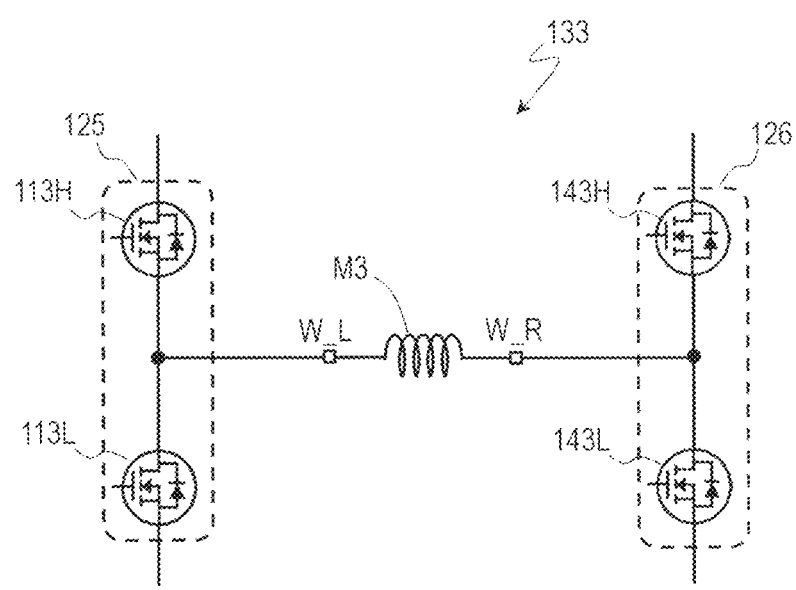
FIG. 4 is a diagram showing an H-bridge included in an electric power conversion apparatus according to an example embodiment of the present disclosure.

FIG. 2, FIG. 3, and FIG. 4 are diagrams showing three H bridges 131, 132, and 133 included in the electric power conversion apparatus 100.

The first inverter 110 has legs 121, 123 and 125. The leg 121 has the FET 111H and the FET 111L. The leg 123 has the FET 112H and the FET 112L. The leg 125 has the FET 113H and the FET 113L.

The second inverter 140 has legs 122, 124 and 126. The leg 122 has the FET 141H and the FET 141L. The leg 124 has the FET 142H and the FET 142L. The leg 126 has the FET 143H and the FET 143L.

The H-bridge 131 shown in FIG. 2 has the leg 121, the winding M1, and the leg 122. The H-bridge 132 shown in FIG. 3 has the leg 123, the winding M2, and the leg 124. The H-bridge 133 shown in FIG. 4 has the leg 125, the winding M3, and the leg 126.

The power source 101 (FIG. 1) generates a predetermined power source voltage. Electric power is supplied from the power source 101 to the first and second inverters 110 and 140. For example, a direct-current power source is used as the power source 101. However, the power source 101 may be an AC-DC converter or a DC-DC converter, or may be a battery (a storage battery). The power source 101 may be a single power source common to the first and second inverters 110, 140, or may comprise a first power source for the first inverter 110 and a second power source for the second inverter 140.

A coil 102 is provided between the power source 101 and the electric power conversion apparatus 100. The coil 102 functions as a noise filter, and smooths high-frequency noise included in a voltage waveform supplied to each inverter or high-frequency noise generated in each inverter so as not to flow out to the power source 101 side. Also, one end of a capacitor 103 is connected between the power source 101 and the electric power conversion apparatus 100. The other end of the capacitor 103 is connected to the GND. The capacitor 103 is a so-called bypass capacitor, and suppresses voltage ripple. The capacitor 103 is, for example, an electrolytic capacitor, and the capacitance and the number to be used are appropriately determined according to design specifications and the like.

FIG. 1 illustrates a configuration in which one shunt resistor is arranged in each leg of each inverter. The first and second inverters 110, 140 may include six or less shunt resistors. The six or less shunt resistors may be connected between the GND and the six or less low-side switching elements of the six legs included in the first and second inverters 110 and 140. Also, extending this to an n-phase motor, the first and second inverters 110, 140 may include 2n or less shunting resistors. 2n or less shunting resistors may be connected between GND and 2n or less low-side switching elements of the 2n legs included in the first and second inverters 110, 140.

Figure 5:
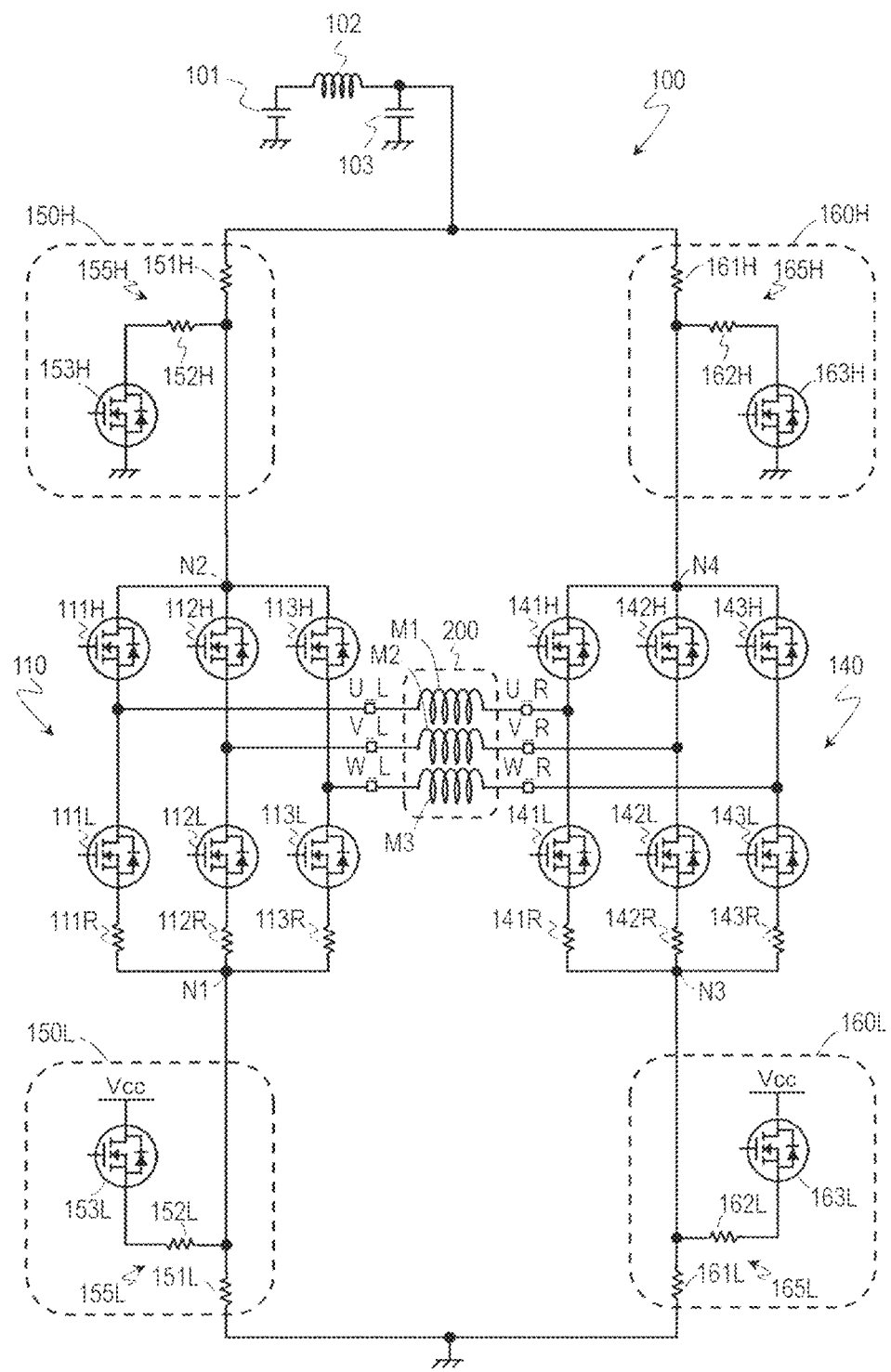
FIG. 5 is a mimetic diagram showing a circuit configuration of an electric power conversion apparatus according to an example embodiment of the present disclosure.

FIG. 5 mimetically shows an example of the circuit configuration of the neutral point potential setting circuits 150L, 150H, 160L, and 160H.

The neutral point potential setting circuit 150L includes a voltage dividing circuit 155L and an isolation switching element 153L. The voltage dividing circuit 155L includes a resistor 151L and a resistor 152L connected in series with each other. The isolation switching element 153L switches connection and disconnection between the voltage dividing circuit 155L and a power source Vcc. In this example, voltage of the power source Vcc is the same as voltage of the power source 101. The voltage of the power source 101 may be supplied as the voltage of the power source Vcc.

A node between the resistor 151L and the resistor 152L is connected to a node N1 to which the FET 111L, 112L and 113L are connected. The resistor 151L is connected between the node N1 and the GND. The resistor 152L is connected between the node N1 and the isolation switching element 153L. The isolation switching element 153L is connected between the resistor 152L and the power source Vcc.

The neutral point potential setting circuit 150H includes a voltage dividing circuit 155H and an isolation switching element 153H. The voltage dividing circuit 155H includes a resistor 151H and a resistor 152H connected in series with each other. The isolation switching element 153H switches connection and disconnection between the voltage dividing circuit 155H and the GND.

A node between resistor 151H and resistor 152H is connected to a node N2 to which the FET 111H, 112H and 113H are connected. The resistor 151H is connected between the node N2 and the power source 101. The resistor 152H is connected between the node N2 and the isolation switching element 153H. The isolation switching element 153H is connected between the resistor 152H and the GND.

The neutral point potential setting circuit 160L includes a voltage dividing circuit 165L and an isolation switching element 163L. The voltage dividing circuit 165L includes a resistor 161L and a resistor 162L connected in series with each other. The isolation switching element 163L switches connection and disconnection between the voltage dividing circuit 165L and the power source Vcc.

A node between the resistor 161L and the resistor 162L is connected to a node N3 to which the FET 141L, 142L and 143L are connected. The resistor 161L is connected between the node N3 and the GND. The resistor 162L is connected between the node N3 and the isolation switching element 163L. The isolation switching element 163L is connected between the resistor 162L and the power source Vcc.

The neutral point potential setting circuit 160H includes a voltage dividing circuit 165H and an isolation switching element 163H. The voltage dividing circuit 165H includes a resistor 161H and a resistor 162H connected in series with each other. The isolation switching element 163H switches connection and disconnection between the voltage dividing circuit 165H and the GND.

A node between the resistor 161H and the resistor 162H is connected to a node N4 to which the FET 141H, 142H and 143H are connected. The resistor 161H is connected between the node N4 and the power source 101. The resistor 162H is connected between the node N4 and the isolation switching element 163H. The isolation switching element 163H is connected between the resistor 162H and the GND.

As the isolation switching elements 153L, 153H, 163L, and 163H, for example, a field effect transistor (typically, a MOSFET) or an insulated gate bipolar transistor (IGBT) can be used. In this specification, an example in which an FET is used as an isolation switching element will be described, and in the following description, the isolation switching element may be referred to as the FET. For example, the isolation switching element 153L is denoted as a FET 153L. The FET 153L 153H, 163L, 163H may be, for example, controlled by a microcontroller or a dedicated driver.

Figure 6:
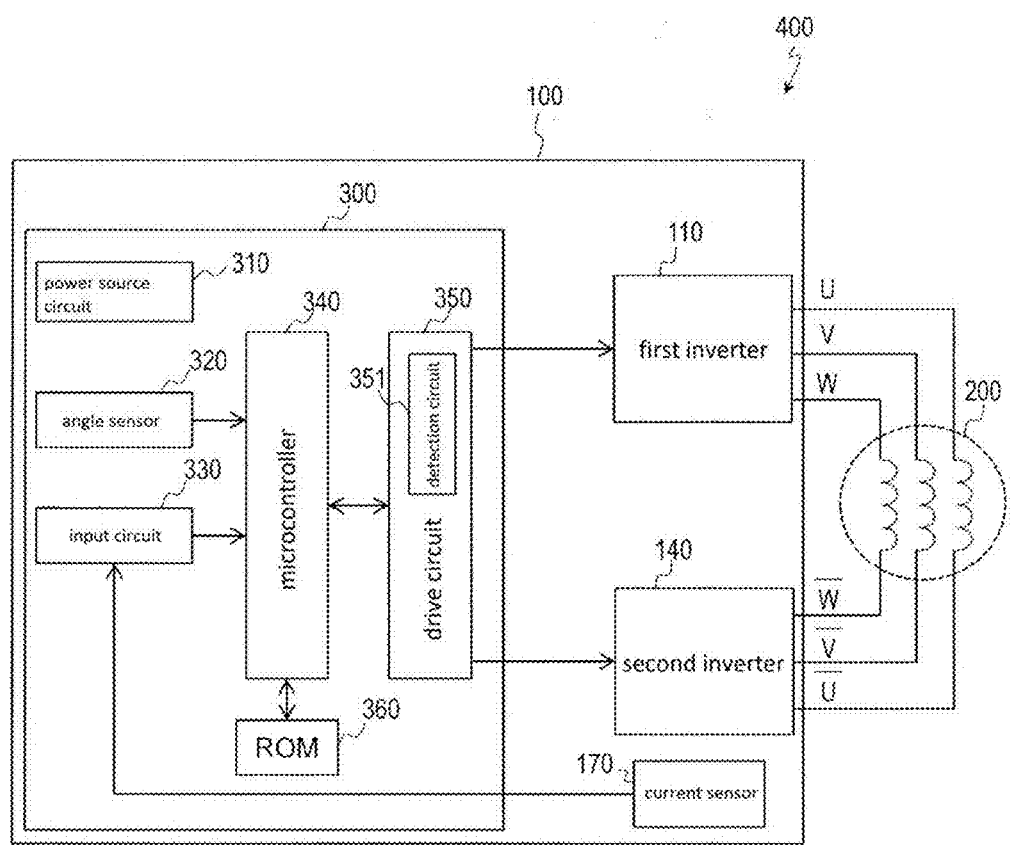
FIG. 6 is a block diagram showing a motor drive unit including an electric power conversion apparatus according to an example embodiment of the present disclosure.

FIG. 6 mimetically shows a block configuration of a motor drive unit 400 including the electric power conversion apparatus 100. The electric power conversion apparatus 100 includes a control circuit 300. The motor drive unit 400 includes the electric power conversion apparatus 100 and the motor 200.

The control circuit 300 includes, for example, a power source circuit 310, an angular sensor 320, an input circuit 330, a microcontroller 340, a drive circuit 350, and a ROM 360.

The control circuit 300 drives the motor 200 by controlling entire operations of the electric power conversion apparatus 100. Specifically, the control circuit 300 can realize closed-loop control by controlling position, rotation speed, current, and the like of a target rotor. Also, the control circuit 300 may include a torque sensor instead of the angle sensor. In this case, the control circuit 300 can control a target motor torque.

The power source circuit 310 generates DC voltages (e.g., 3V and 5V) required for respective blocks in a circuit. The angle sensor 320 is, for example, a resolver or a hall IC. As the angle sensor 320, a magnetoresistance effect element and a magnet may be used. The angle sensor 320 detects rotation angle (hereinafter, referred to as "rotation signal") of the rotor of the motor 200, and outputs the rotation signal to the microcontroller 340. The input circuit 330 receives a motor current value (hereinafter, referred to as "actual current value") detected by the current sensor 170, converts a level of the actual current value into an input level of the microcontroller 340, as necessary, and outputs the actual current value to the microcontroller 340.

The microcontroller 340 controls a switching operation (turn-on or turn-off) of each FET of the first inverter 110, the second inverter 140, and the neutral point potential setting circuits 150L, 150H, 160L, and 160H. The microcontroller 340 sets a target current value according to an actual current value, a rotation signal of the rotor, and the like, generates a PWM signal, and outputs the PWM signal to the drive circuit 350.

The drive circuit 350 is typically a gate driver. The drive circuit 350 generates a control signal for controlling the switching operation of each FET in the first and second inverters 110 and 140 according to the PWM signal, and provides the control signal to a gate of each FET. Further, the microcontroller 340 may have function of the drive circuit 350. In this case, the control circuit 300 may not include the drive circuit 350.

The ROM 360 is, for example, a writable memory, a rewritable memory, or a read-only memory. The ROM 360 stores a control program including instructions for causing the microcontroller 340 to control the power converter 100.

For example, the control program is temporarily expanded in a RAM (not shown) when booting.

The electric power conversion apparatus 100 has a control in normal state and in abnormal state. The control circuit 300 (mainly the microcontroller 340), can switch control for the electric power conversion apparatus 100 from the control in normal state to the control in abnormal state.

First, a specific example of control method of the electric power conversion apparatus 100 in normal state will be described. As described above, the normal state refers to a state in which a fault has not occurred in each FET of the first and second inverters 110 and 140.

In the control in normal state, the FET 153L, 153H, 163L, and 163H of the neutral-point potential setting circuits 150L, 150H, 160L, and 160H are all turned off. In this state, the control circuit 300 drives the motor 200 by performing three-phase current carrying control using both side of the first and second inverters 110 and 140. Specifically, the control circuit 300 performs three-phase current carrying control by switching control the FET of the first inverter 110 and the FET of the second inverter 140 to opposite phase (phase difference=180°) to each other. For example, focusing on a H-bridge including the FET 111L, 111H, 141L, and 141H, when the FET 111L is turned on, the FET 141L is turned off, and when the FET 111L is turned off, the FET 141L is turned on. Similarly, when the FET 111H is turned on, the FET 141H is turned off, and when the FET 111H is turned off, the FET 141H is turned on. The current outputted from the electric power source 101 flows to the GND through the high-side switching element, the winding, and the low-side switching element.

Here, a path of a current through the U-phase winding M1 will be described. When the FET 111H and the FET 141L are on, and the FET 141H and the FET 111L are off, the current flows through the power source 101, the FET 111H, the windings M1, the FET 141L, and the GND in that order. When the FET 141H and the FET 111L are on, and the FET 111H and the FET 141L are off, the current flows through the power source 101, the FET 141H, the windings M1, the FET 111L, and the GND in that order.

Next, a path of a current flowing through the V-phase winding M2 will be described.

When the FET 112H and the FET 142L are on, and the FET 142H and the FET 112L are off, the current flows through the power source 101, the FET 112H, the windings M2, the FET 142L, and the GND in that order. When the FET 142H and the FET 112L are on, and the FET 112H and the FET 142L are off, the current flows through the power source 101, the FET 142H, the windings M2, the FET 112L, and the GND in that order.

Next, a path of a current flowing through the W-phase winding M3 will be described.

When the FET 113H and the FET 143L are on, and the FET 143H and the FET 113L are off, the current flows through the power source 101, the FET 113H, the windings M3, the FET 143L, and the GND in that order. When the FET 143H and the FET 113L are on, and the FET 113H and the FET 143L are off, the current flows through the power source 101, the FET 143H, the windings M3, the FET 113L, and the GND in that order.

Figure 7:
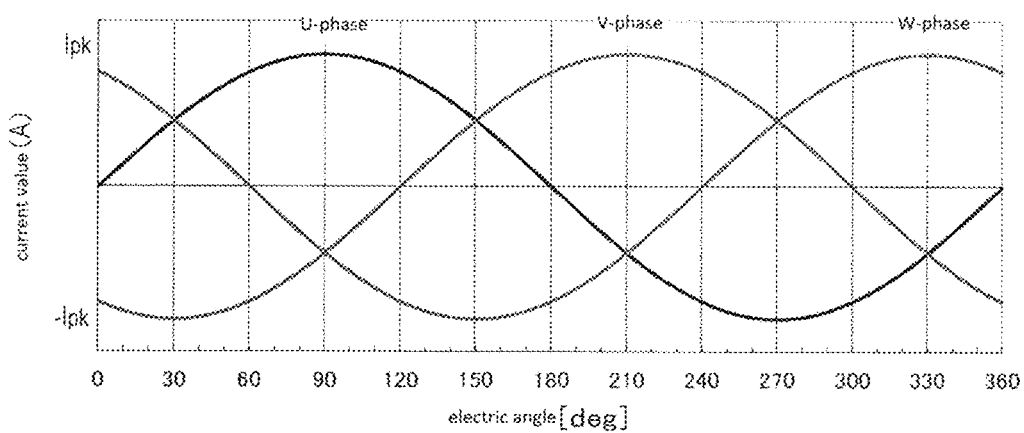
FIG. 7 is a diagram showing current waveforms obtained by plotting current values flowing through each of windings of U-phase, V-phase, and W-phase of a motor, when an electric power conversion apparatus is controlled in accordance with a three-phase current carrying control in normal state according to an example embodiment of the present disclosure.

FIG. 7 illustrates a current waveform (a sine wave) obtained by plotting current values flowing through the U-phase, the V-phase, and the W-phase windings of the motor 200 when the electric power conversion apparatus 100 is controlled according to the three-phase current carrying control in normal state. A horizontal axis represents a motor electric angle (deg), and a vertical axis represents a current value (A). In the current waveform of FIG. 7, the current value is plotted for each electrical angle of 30°. $I_{pk}$ represents a maximum current value (peak current value) of each phase.

Table 1 shows the values of the currents flowing through terminals of each inverter for each electric angle in the sine wave of FIG. 7. Specifically, Table 1 shows the values of the currents flowing to the terminals U_L, V_L, and W_L of the first inverter 110 (bridge circuit L) at every 30° of the electrical angle, and the values of the currents values flowing to the terminals U_R, V_R, and W_R of the second inverter 140 (bridge circuit R) at every 30 degrees of the electrical angle. Here, for the bridge circuit L, a direction of a current flowing from the terminal of the bridge circuit L to the terminal of the bridge circuit R is defined as a positive direction. The current direction shown in FIG. 7 follows this definition. Also, for the bridge circuit R, a direction of a current flowing from the terminal of the bridge circuit R to the terminal of the bridge circuit L is defined as a positive direction. Therefore, a phase difference between the current of the bridge circuit L and the current of the bridge circuit R is 180°. In Table 1, magnitude of a current value $I_1$ is $[(3)^{1/2}/2]*I_{pk}$, and magnitude of a current value $I_2$ is $I_{pk}/2$.

TABLE 1

| | | electrical angle [deg] | | | | | | | | | | | |
|---|---|---|---|---|---|---|---|---|---|---|---|---|---|
| normal state | | 0 (360) | 30 | 60 | 90 | 120 | 150 | 180 | 210 | 240 | 270 | 300 | 330 |
| bridge circuit L | U_L | 0 | $I_2$ | $I_1$ | Ipk | $I_1$ | $I_2$ | 0 | $-I_2$ | $-I_1$ | $-$Ipk | $-I_1$ | $-I_2$ |
| | V_L | $-I_1$ | $-$Ipk | $-I_1$ | $-I_2$ | 0 | $I_2$ | $I_1$ | Ipk | $I_1$ | $I_2$ | 0 | $-I_2$ |
| | W_L | $I_1$ | $I_2$ | 0 | $-I_2$ | $-I_1$ | $-$Ipk | $-I_1$ | $-I_2$ | 0 | $I_2$ | $I_1$ | Ipk |
| bridge circuit R | U_R | 0 | $-I_2$ | $-I_1$ | $-$Ipk | $-I_1$ | $-I_2$ | 0 | $I_2$ | $I_1$ | Ipk | $I_1$ | $I_2$ |
| | V_R | $I_1$ | Ipk | $I_1$ | $I_2$ | 0 | $-I_2$ | $-I_1$ | $-$Ipk | $-I_1$ | $-I_2$ | 0 | $I_2$ |
| | W_R | $-I_1$ | $-I_2$ | 0 | $I_2$ | $I_1$ | Ipk | $I_1$ | $I_2$ | 0 | $-I_2$ | $-I_1$ | $-$Ipk |

A current does not flow to the U-phase wiring M1 at an electric angle of 0°. A current of magnitude $I_1$ flows from the bridge circuit R to the bridge circuit L in the V-phase winding M2, and a current of magnitude $I_1$ flows from the bridge circuit L to the bridge circuit R in the W-phase winding M3.

At an electrical angle of 30°, a current of magnitude $I_2$ flows from the bridge circuit L to the bridge circuit R in the U-phase winding M1, a current of magnitude $I_{pk}$ flows from the bridge circuit R to the bridge circuit L in the V-phase winding M2, and a current of magnitude $I_2$ flows from the bridge circuit L to the bridge circuit R in the W-phase winding M3.

At an electrical angle of 60°, a current of magnitude $I_1$ flows from the bridge circuit L to the bridge circuit R in the U-phase winding M1, and a current of magnitude $I_1$ flows from the bridge circuit R to the bridge circuit L in the V-phase winding M2. No current flows through the W-phase winding M3.

At an electrical angle of 90°, a current of magnitude $I_{pk}$ flows from the bridge circuit L to the bridge circuit R in the U-phase winding M1, a current of magnitude $I_2$ flows from the bridge circuit R to the bridge circuit L in the V-phase winding M2, and a current of magnitude $I_2$ flows from the bridge circuit R to the bridge circuit L in the W-phase winding M3.

At an electrical angle of 120°, a current of magnitude $I_1$ flows from the bridge circuit L to the bridge circuit R in the U-phase winding M1, and a current of magnitude $I_1$ flows from the bridge circuit R to the bridge circuit L in the W-phase winding M3. No current flows through the V-phase winding M2.

At an electrical angle of 150°, a current of magnitude $I_2$ flows from the bridge circuit L to the bridge circuit R in the U-phase winding M1, a current of magnitude $I_2$ flows from the bridge circuit L to the bridge circuit R in the V-phase winding M2, and a current of magnitude $I_{pk}$ flows from the bridge circuit R to the bridge circuit L in the W-phase winding M3.

At an electrical angle of 180°, no current flows through the U-phase winding M1. A current of magnitude $I_1$ flows from the bridge circuit L to the bridge circuit R in the V-phase winding M2, and a current of magnitude $I_1$ flows from the bridge circuit R to the bridge circuit L in the W-phase winding M3.

At an electrical angle of 210°, a current of magnitude $I_2$ flows from the bridge circuit R to the bridge circuit L in the U-phase winding M1, a current of magnitude $I_{pk}$ flows from the bridge circuit L to the bridge circuit R in the V-phase winding M2, and a current of magnitude $I_2$ flows from the bridge circuit R to the bridge circuit L in the W-phase winding M3.

At an electrical angle of 240°, a current of magnitude $I_1$ flows from the bridge circuit R to the bridge circuit L in the U-phase winding M1, and a current of magnitude $I_1$ flows from the bridge circuit L to the bridge circuit R in the V-phase winding M2.

No current flows through the W-phase winding M3.

At an electrical angle of 270°, a current of magnitude $I_{pk}$ flows from the bridge circuit R to the bridge circuit L in the U-phase winding M1, a current of magnitude $I_2$ flows from the bridge circuit L to the bridge circuit R in the V-phase winding M2, and a current of magnitude $I_2$ flows from the bridge circuit L to the bridge circuit R in the W-phase winding M3.

At an electrical angle of 300°, a current of magnitude $I_1$ flows from the bridge circuit R to the bridge circuit L in the U-phase winding M1, and a current of magnitude $I_1$ flows from the bridge circuit L to the bridge circuit R in the W-phase winding M3. No current flows through the V-phase winding M2.

At an electrical angle of 330°, a current of magnitude $I_2$ flows from the bridge circuit R to the bridge circuit L in the U-phase winding M1, a current of magnitude $I_2$ flows from the bridge circuit R to the bridge circuit L in the V-phase winding M2, and a current of magnitude $I_{pk}$ flows from the bridge circuit L to the bridge circuit R in the W-phase winding M3.

For example, the control circuit 300 controls the switching operation of each FET of the bridge circuits L and R by PWM control such that a current waveform shown in FIG. 7 is obtained.

A specific example of a control method for the electric power conversion apparatus 100 in abnormal state will be described. As described above, the abnormal state mainly means that a fault has occurred in the FET. Faults of FETs are roughly classified into an "open-fault" and a "short-fault". The "open-fault" refers to a fault in which a source-drain of the FET is opened each other (in other words, a resistance rds between the source and drain becomes high impedance). The "short-fault" refers to a fault in which the source-drain of the FET is short-circuited each other.

FIG. 1 is referred again. During operation of the electric power conversion apparatus 100, it is generally considered that a random fault occurs in which one FET is randomly faulted out of the 12 FETs in the two inverters. The present disclosure is directed mainly to a control method of the electric power conversion apparatus 100 in the case where a random fault occurs. However, the present disclosure is also directed to a control method of the electric power conversion apparatus 100, such as a case where a plurality of FETs fails in a chained manner. The fault in chained manner means, for example, a fault that occurs simultaneously in a high-side switching element and a low-side switching element of one leg.

If the electric power conversion apparatus 100 is used for a long period of time, a random fault may occur. Also, the random fault is different from manufacturing fault that may occur at the time of manufacturing. If even one of the plurality of FETs in the two inverters fails, the three-phase current carrying control in normal state cannot be performed.

The drive circuit 350 of the present example embodiment includes a detection circuit 351 for detecting a fault of a plurality of FETs included in the first inverter 110 and the second inverter 140. Each FET includes a gate electrode, a source electrode and a drain electrode. As an example of the fault detection, the detection circuit 351 monitors a voltage Vds between the drain and the source of the FET, and detects the fault of the FET by comparing predetermined threshold voltage with the voltage Vds. For example, the threshold voltage is set in the drive circuit 350 by data communication with an external IC (not shown) and external components. The drive circuit 350 is connected to a port of the microcontroller 340 and notifies the microcontroller 340 of a fault detection signal. For example, the drive circuit 350 asserts the fault detection signal when detecting the fault of the FET. When the asserted fault detection signal is received, the microcontroller 340 reads internal data of the drive circuit 350, and determines which of the plurality of FETs in the two inverters is faulty.

In the present example embodiment, the drive circuit 350 includes the detection circuit 351 for detecting the fault of the FET, but such the detection circuit for detecting the fault of the FET may be provided separately from the drive circuit 350. Also, as another example of a fault detection, the microcontroller 340 may detect the fault in the FET based on a difference between an actual current value and a target current value of the motor. However, the fault detection of the FET is not limited to these methods, and a known method relating to the fault detection of the FET can be widely used.

When the fault detection signal is asserted, the microcontroller 340 switches the control for the electric power converter 100 from the control in normal state to the control in abnormal state. For example, the timing at which the control is switched from in normal state to in abnormal state is about 10 msec to 30 msec after the fault detection signal is asserted.

Hereinafter, the control for the electric power conversion apparatus 100 in abnormal state will be described in more detail.

Figure 8:
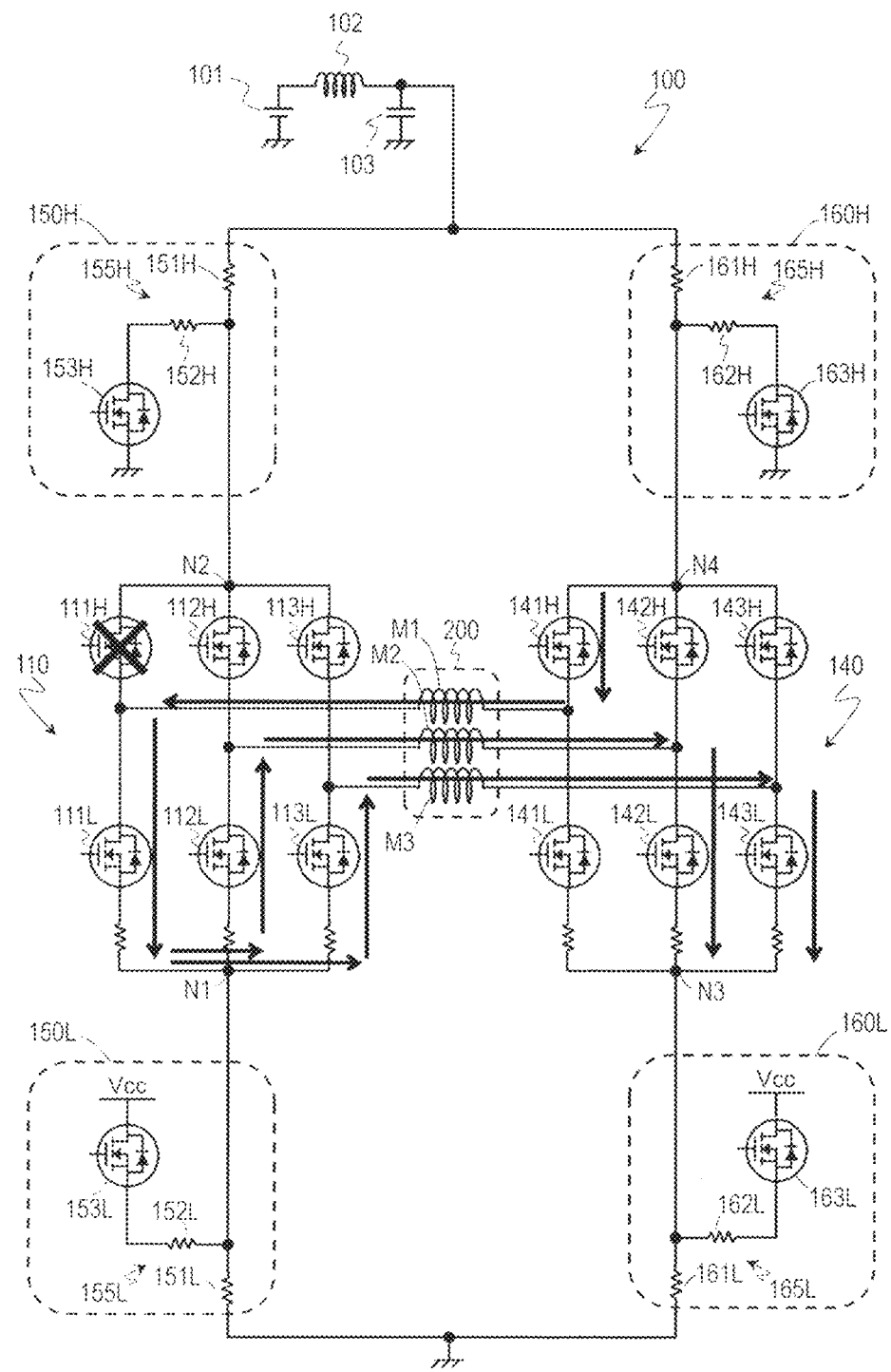
FIG. 8 is a mimetic diagram showing an electric power conversion apparatus in abnormal state according to an example embodiment of the present disclosure.

FIG. 8 is a mimetic diagram showing the electric power conversion apparatus 100 in abnormal state. First, it will be described, a control when the three high-side switching elements include an open-faulty switching element, in the bridge circuit of the first inverter 110.

In this example embodiment, it is assumed that the FET 111H of the high-side switching elements (the FET 111H, 112H, and 113H) of the first inverter 110 is open-faulty. Also, even when the FET 112H or 113H is open-faulty, the electric power conversion apparatus 100 can be controlled by control method described below.

When the high-side switching element 111H is open-faulty, the control circuit 300 turns off all the high-side switching elements 112H and 113H other than the open-faulty high-side switching element 111H in the first inverter 110. The control circuit 300 turns on all the low-side switching elements 111L, 112L, and 113L of the first inverter 110. Also, the control circuit 300 turns on the FET 153L of the neutral-point potential setting circuit 150L. The control circuit 300 turns off the FET 153H, 163L, and 163H of the neutral-point potential setting circuits 150H, 160L, and 160H.

By turning on all of the three low-side switching elements 111L, 112L, and 113L, the node N1 of the low-side side functions as a neutral point of each winding. In the present specification, the fact that some node functions as a neutral point is expressed as "a neutral point is configured". The electric power conversion apparatus 100 drives the motor 200 by using the neutral point which is configured in the low-side side of the first inverter 110 and the second inverter 140.

Figure 9:
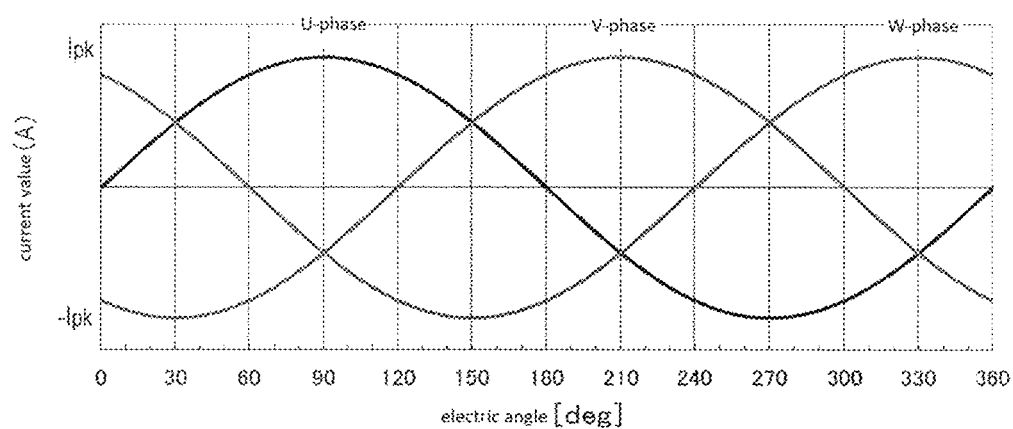
FIG. 9 is a diagram showing current waveforms obtained by plotting current values flowing through each of windings of U-phase, V-phase, and W-phase of a motor in accordance with a control in abnormal state according to an example embodiment of the present disclosure.

FIG. 8 mimetically shows the flow of the current in the electric power conversion apparatus 100 when a neutral point is configured in the node N1. FIG. 9 illustrates current waveforms obtained by plotting current values flowing through the U-phase, V-phase, and W-phase windings of the motor 200 when the electric power conversion 100 is controlled in a state where a neutral point is configured in the node N1. FIG. 8 shows, as an example, the flow of current at a motor electrical angle of 270° with solid arrows. Each of the three solid arrows represents a current flowing from the electric power source 101 to the motor 200.

In the state shown in FIG. 8, in the second inverters 140, the FET 141H, 142L and 143L are in the on state, the FET 141L, 142H and 143H are in the off state. The current flowing through the FET 141H of the second inverter 140 flows through the windings M1 and the FET 111L of the first inverter 110 to the neutral point (the node N1). A portion of the current flows through the FET 112L to the winding M2, and the remaining current flows through the FET 113L to the winding M3. The current flowing through the windings M2 and M3 flows through the FET 142L of the second inverter 140 and the second inverter 143L to the GND.

Table 2 illustrates the value of the current flowing through the terminal of the second inverter 140 for each electric angle in the current waveform of FIG. 9. Specifically, Table 2 exemplifies the value of the current flowing through the terminals U_R, V_R, and W_R of the second inverter 140 (the bridge circuit R) at every electric angle 30°. The definition of the current direction is as described above. Also, according to the definition of the current direction, signs of positive and negative of the current value shown in FIG. 9 is a relationship of opposite (the phase difference is 180°) to that of the current value shown in Table 2.

TABLE 2

| normal state | | 0 (360) | 30 | 60 | 90 | 120 | 150 | 180 | 210 | 240 | 270 | 300 | 330 |
|---|---|---|---|---|---|---|---|---|---|---|---|---|---|
| | | | | | | electrical angle [deg] | | | | | | | |
| bridge circuit R | U_R | 0 | $-I_2$ | $-I_1$ | $-I_{pk}$ | $-I_1$ | $-I_2$ | 0 | $I_2$ | $I_1$ | $I_{pk}$ | $I_1$ | $I_2$ |
| | V_R | $I_1$ | $I_{pk}$ | $I_1$ | $I_2$ | 0 | $-I_2$ | $-I_1$ | $-I_{pk}$ | $-I_1$ | $-I_2$ | 0 | $I_2$ |
| | W_R | $-I_1$ | $-I_2$ | 0 | $I_2$ | $I_1$ | $I_{pk}$ | $I_1$ | $I_2$ | 0 | $-I_2$ | $-I_1$ | $-I_{pk}$ |

For example, at an electrical angle of 30°, a current of magnitude $I_2$ flows from the bridge circuit L to the bridge circuit R in the U-phase winding M1, a current of magnitude $I_{pk}$ flows from the bridge circuit R to the bridge circuit L in the V-phase winding M2, and a current of magnitude $I_2$ flows from the bridge circuit L to the bridge circuit R in the W-phase winding M3. At an electrical angle of 60°, a current of magnitude $I_1$ flows from the bridge circuit L to the bridge circuit R in the U-phase winding M1, and a current of magnitude $I_1$ flows from the bridge circuit R to the bridge circuit L in the V-phase winding M2. No current flows through the W-phase winding M3. The sum of the current flowing into the neutral point and the current flowing out of the neutral point is always "0" for each electric angle. For example, the control circuit 300 controls the switching operation of each FET of the bridge circuit R by PWM control such that the current waveform shown in FIG. 9 is obtained.

As shown in Tables 1 and 2, between the control in normal state and the control in abnormal state, it can be seen that the motor current flowing through the motor 200 does not change for each electric angle. Therefore, an assist torque of the motor is not reduced in the control in abnormal state as compared with the control in normal state.

In the example shown in FIG. 8, the FET 153L of the neutral-point potential setting circuit 150L is turned on. A current to flow from the power source Vcc through the resistor 152L and the resistor 151L to the GND, by a voltage supplied from the power source Vcc. The node N1 is connected between the resistors 151L and 152L connected in series with each other. That is, the potential between the resistor 151L and the resistor 152L is supplied to the neutral point configured in the node N1. By setting the electric resistance value of the resistors 151L and 152L and the output voltage of the power supply Vcc to an arbitrary value, the potential supplied to the neutral point can be set to an arbitrary value.

Since the potential between the resistor 151L and the resistor 152L is constant, the potential of the neutral point can be fixed to a constant value. As a result, the power loss in the electric power conversion apparatus 100 can be reduced. By fixing the potential of the neutral point to a constant value, a torque ripple, an average torque, and an efficiency of the motor can be improved.

Figure 10:
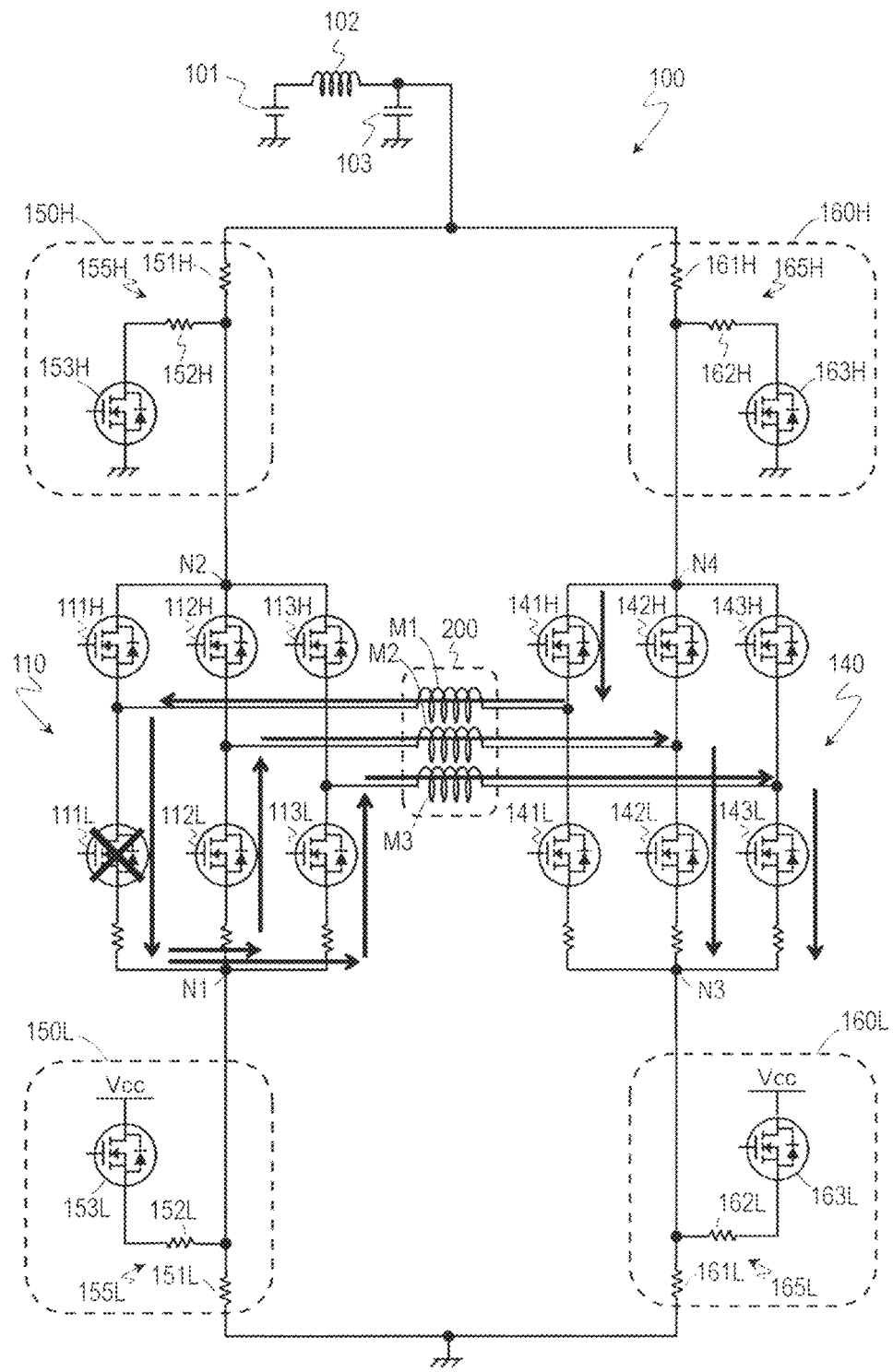
FIG. 10 is a mimetic diagram showing another example of an electric power conversion apparatus in abnormal state according to an example embodiment of the present disclosure.

Next, it will be described that the control when the three low-side switching elements include a short-faulty switching element, in the bridge circuit of the first inverter 110. FIG. 10 is a mimetic diagram showing another example of the electric power conversion apparatus 100 in abnormal state.

In this example embodiment, it is assumed that the FET 111L of the low-side switching elements (the FET 111L, 112L, and 113L) of the first inverters 110 is short-faulty. Also, even when the FET 112L or 113L is short-faulty, the electric power conversion apparatus 100 can be controlled by control method described below.

When the low-side switching element 111L is short-faulty, the control circuit 300 turns on all the low-side switching elements 112L and 113L other than the short-faulty low-side switching element 111L in the first inverter 110. The control circuit 300 turns off all the high-side switching elements 111H, 112H, and 113H of the first inverter 110. The control circuit 300 turns on the FET 153L of the neutral-point potential setting circuit 150L. The control circuit 300 turns off the FET 153H, 163L, and 163H of the neutral-point potential setting circuits 150H, 160H, and 160L.

When all of the three low-side switching elements 111L, 112L, and 113L become conductive, the node N1 of the low-side side functions as a neutral point of each winding. The electric power conversion apparatus 100 drives the motor 200 by using the neutral point which is configured in the low-side side of the first inverter 110 and the second inverter 140.

FIG. 10 mimetically shows the flow of current in the electric power conversion apparatus 100 when a neutral point is configured in the node N1. FIG. 10 shows, as an example, the flow of current at a motor electrical angle of 270° with solid arrows. Each of the three solid arrows represents a current flowing from the power source 101 to the motor 200. Similar to the control in the fault state shown in FIG. 8, the control circuit 300 controls, for example, the switching operation of each FET of the second inverter 140 (the bridge circuit R) by the PWM control such that the current waveform shown in FIG. 9 is obtained.

Similar to the control in the fault state shown in FIG. 8, the potential between the resistor 151L and the resistor 152L is supplied to the neutral point configured in the node N1.

Since the potential between the resistor 151L and the resistor 152L is constant, the potential of the neutral point can be fixed to a constant value. As a result, the power loss in the electric power conversion apparatus 100 can be reduced.

Figure 11:
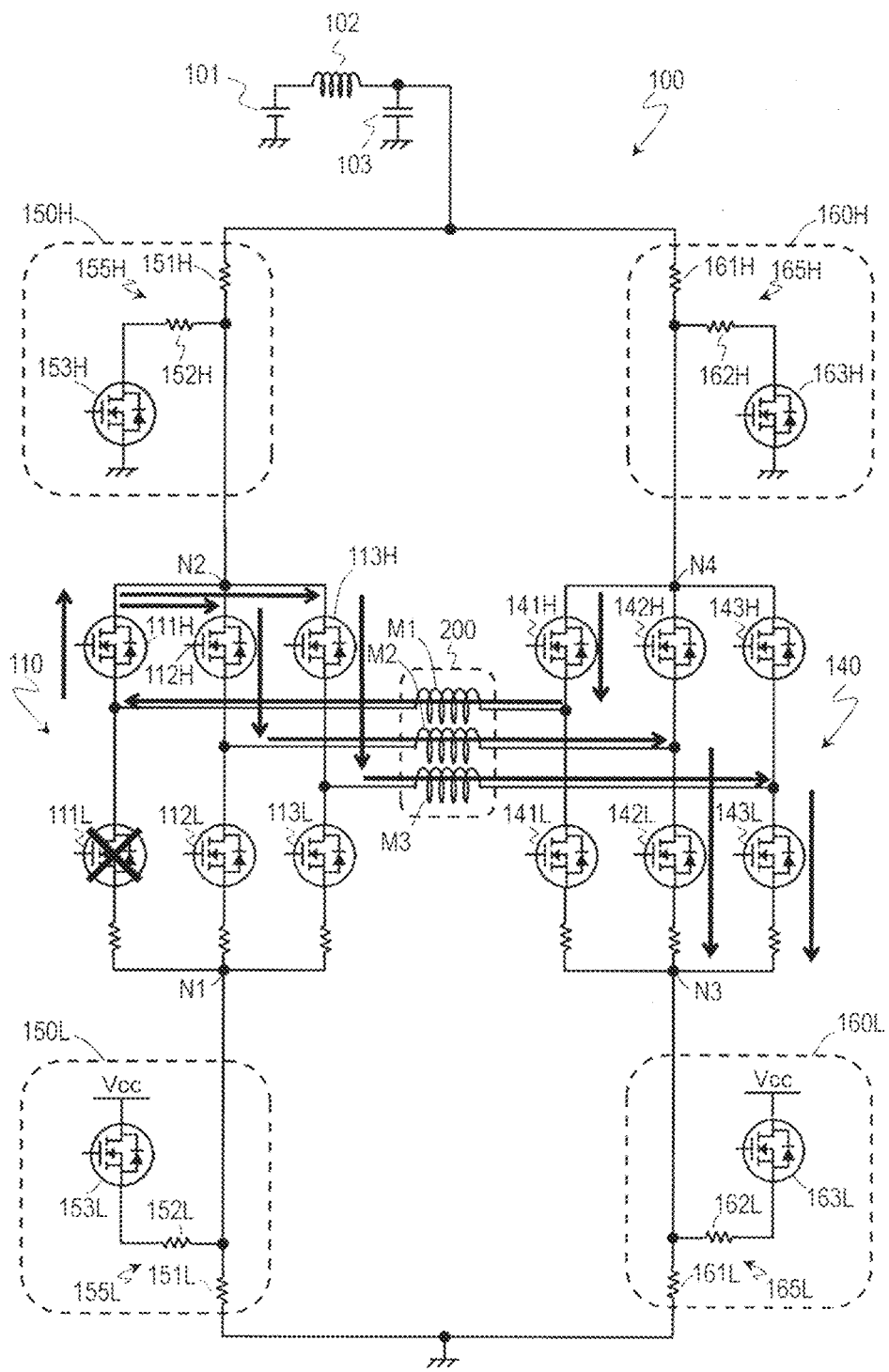
FIG. 11 is a mimetic diagram showing still another example of an electric power conversion apparatus in abnormal state according to an example embodiment of the present disclosure.

Next, it will be described that the control when the three low-side switching elements include an open-faulty switching element, in the bridge circuit of the first inverter 110. FIG. 11 is a mimetic diagram showing another example of the electric power conversion apparatus 100 in abnormal state.

In this case, it is assumed that the FET 111L of the low-side switching elements (FET 111L, 112L, and 113L) of the first inverters 110 is open-faulty. Also, even when the FET 112L or 113L is open-faulty, the electric power conversion 100 can be controlled by control method described below.

When the high-side switching element 111L is open-faulty, the control circuit 300 turns off all the low-side switching elements 112L and 113L other than the open-faulty low-side switching element 111L in the first inverter 110. The control circuit 300 turns on all the high-side switching elements 111H, 112H, and 113H of the first inverter 110. Also, the control circuit 300 turns on the FET 153H of the neutral-point potential setting circuit 150H. The control circuit 300 turns off the FET 153L, 163H, and 163L of the neutral-point potential setting circuits 150L, 160H, and 160L.

By turning on all three high-side switching elements 111H, 112H, and 113H, the node N2 of the high-side side functions as a neutral point of each winding. The electric power conversion 100 drives the motor 200 by using the neutral point which is configured in the high-side side of the first inverter 110 and the second inverter 140.

FIG. 11 mimetically shows the flow of current in the electric power conversion apparatus 100 when a neutral point is configured in the node N2. FIG. 11 shows, as an example, the flow of current at a motor electrical angle of 270° with solid arrows. Each of the three solid arrows represents a current flowing from the power source 101 to the motor 200.

In the state shown in FIG. 11, in the second inverters 140, the FET 141H, 142L and 143L are in the on state, the FET 141L, 142H and 143H are in the off state. The current flowing through the FET 141H of the second inverter 140 flows through the windings M1 and the FET 111H of the first inverter 110 to the neutral point (the node N2). A portion of the current flows through the FET 112H to the winding M2, and the remaining current flows through the FET 113H to the winding M3. The current flowing through the windings M2 and M3 flows through the FET 142L and 143L of the second inverter 140 to the GND.

For example, the control circuit 300 controls the switching operation of each FET of the bridge circuit R by PWM control such that the current waveform shown in FIG. 9 is obtained.

In an example shown in FIG. 11, the FET 153H of the neutral-point potential setting circuit 150H is turned on. A current to flow from the power source 101 through the resistor 151H and the resistor 152H to the GND, by a voltage supplied from the power source 101. The node N2 is connected between the resistors 151H and 152H connected in series with each other. That is, the potential between the resistors 151H and 152H is supplied to the neutral point configured in the node N2. By setting the resistors 151H and 152H to an arbitrary electrical resistance value, the potential supplied to the neutral point can be set to an arbitrary value.

Since the potential between the resistor 151H and the resistor 152H is constant, the potential of the neutral point can be fixed to a constant value. As a result, the power loss in the electric power conversion apparatus 100 can be reduced.

Figure 12:
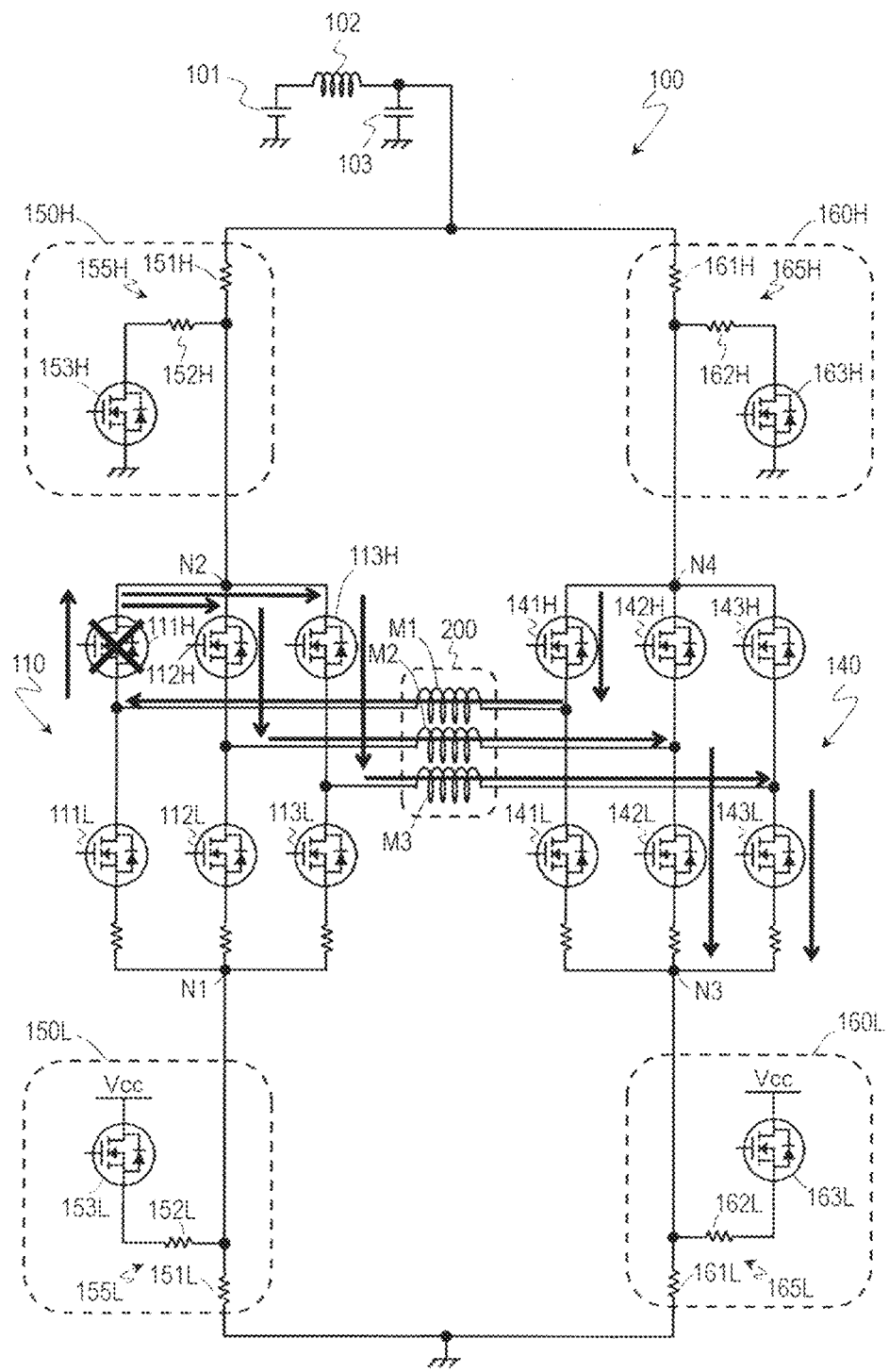
FIG. 12 is a mimetic diagram showing still another example of an electric power conversion apparatus in abnormal state according to an example embodiment of the present disclosure.

Next, it will be described that the control when the three high-side switching elements include a short-faulty switching element, in the bridge circuit of the first inverter 110. FIG. 12 is a mimetic diagram showing another example of the electric power conversion apparatus 100 in abnormal state.

In this example embodiment, it is assumed that the FET 111H is short-faulty among the high-side switching elements (FET 111H, 112H, and 113H) of the first inverters 110. Also, even when the FET 112H or 113H is short-faulty, the electric power conversion apparatus 100 can be controlled by control method described below.

When the high-side switching element 111H is short-faulty, the control circuit 300 turns on all the high-side switching elements 112H and 113H other than the short-faulty high-side switching element 111H in the first inverter 110. The control circuit 300 turns off all the low-side switching elements 111L, 112L, and 113L of the first inverter 110. Also, the control circuit 300 turns on the FET 153H of the neutral-point potential setting circuit 150H. The control circuit 300 turns off the FET 153L, 163H, and 163L of the neutral-point potential setting circuits 150L, 160H, and 160L.

When all of the three high-side switching elements 111H, 112H, and 113H become conductive, the node N2 of the high-side side functions as a neutral point of each winding. The power converter 100 drives the motor 200 by using the neutral point which is configured in the high-side side of the first inverter 110 and the second inverter 140.

FIG. 12 mimetically shows the flow of current in the electric power conversion apparatus 100 when a neutral point is configured in the node N2. FIG. 12 shows, as an example, the flow of current at a motor electrical angle of 270° with solid arrows. Each of the three solid arrows represents a current flowing from the power source 101 to the motor 200. The current flow in the electric power conversion apparatus 100 is the same as the current flow shown in FIG. 11. Similar to the control in the fault state shown in FIG. 8, for example, the control circuit 300 controls the switching operation of each FET of the second inverter 140 (bridge circuit R) by the PWM control such that the current waveform shown in FIG. 9 is obtained.

Similar to the control in the fault state shown in FIG. 11, the potential between the resistor 151H and the resistor 152H is supplied to the neutral point configured in the node N2.

Since the potential between the resistor 151H and the resistor 152H is constant, the potential of the neutral point can be fixed to a constant value. As a result, the power loss in the electric power conversion apparatus 100 can be reduced.

At least one of the resistors 151L, 152L, 151H, and 152H may be a variable resistor. The control circuit 300 can change magnitude of the potential supplied to the neutral point by changing resistance value of the variable resistor. Also, as a method of changing the magnitude of the potential supplied to the neutral point, when the neutral point is configured at the node N1, the FET 153L may be repeatedly switched on and off. Also, when the neutral point is configured in the node N2, the FET 153H may be repeatedly turned on and off.

In the above description of FIGS. 8 to 12, the first inverter 110 of the two inverters is treated as a faulty inverter, and the second inverter 140 is treated as a normal inverter. In case where the second inverter 140 is a faulty inverter and the first inverter 110 is a normal inverter, the control in abnormal state can be performed similarly to the above. In this case, the control for the first inverter 110, the second inverter 140, and the neutral point potential setting circuits 150L, 150H, 160L, and 160H is reversed from the control described above.

More specifically, when the second inverter 140 is a faulty inverter, the control for the first inverter 110 and the second inverter 140 is reversed from the control described above. The control for the neutral point potential setting circuit 150L and the neutral point potential setting circuit 160L is reversed from the above control. The control of the neutral point potential setting circuit 150H and the neutral point potential setting circuit 160H is reversed from the above control. The motor 200 can be driven by configuring a neutral point in the second inverter 140, and using the neutral point and the first inverter 110.

Figure 13:
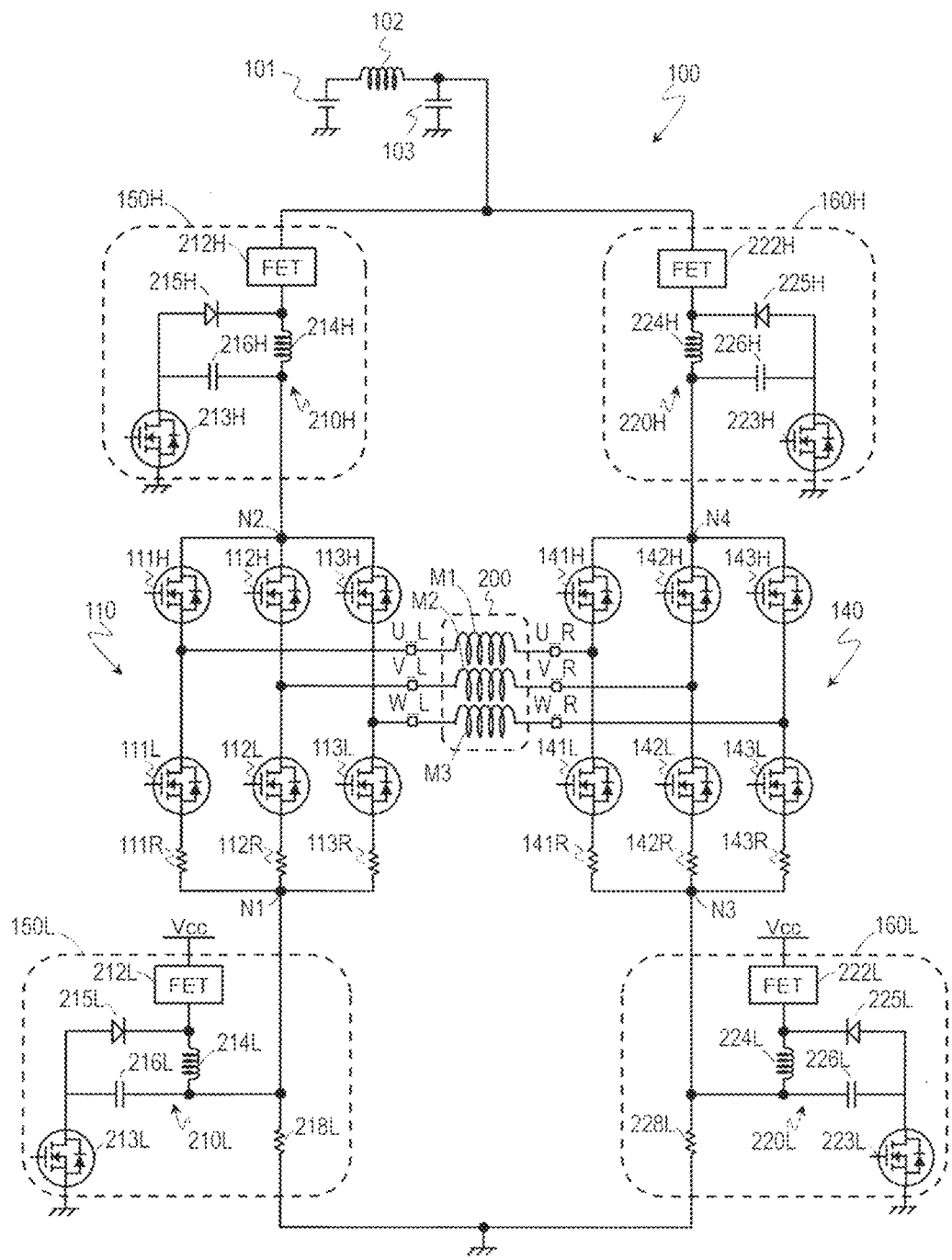
FIG. 13 is a mimetic diagram showing another example of circuit configuration of an electric power conversion apparatus according to an example embodiment of the present disclosure.

FIG. 13 mimetically shows another example of the circuit configuration of the neutral point potential setting circuits 150L, 150H, 160L, and 160H.

The neutral point potential setting circuit 150L shown in FIG. 13 includes a step-down circuit 210L, an isolation switching element 213L, and a resistor 218L. The step-down circuit 210L is connected to the node N1. The isolation switching element 213L switches connection and disconnection between the step-down circuit 210L and the GND.

The step-down circuit 210L includes a FET 212L, an inductor 214L, a diode 215L, and a capacitor 216L.

An end of the inductor 214L and an end of the capacitor 216L are connected to the node N1. The FET 212L is connected between the other end of the inductor 214L and the power source Vcc. In this example, the voltage of the power supply Vcc is the same as the voltage of the power source 101. The voltage of the power source 101 may be supplied as the voltage of the power source Vcc. The FET 212L switches connection and disconnection between the inductor 214L and the power source Vcc. A cathode of the diode 215L is connected between the other end of the inductor 214L and the FET 212L of the diode 215L. An anode of the diode 215L and the other end of the capacitor 216L are connected to the isolation switching element 213L. Resistor 218L is connected between the node N1 and the GND.

The neutral point potential setting circuit 150H includes a step-down circuit 210H and an isolation switching element 213H. The step-down circuit 210H is connected to the node N2. The isolation switching element 213H switches connection and disconnection between the step-down circuit 210H and the GND.

The step-down circuit 210H includes a FET 212H, an inductor 214H, a diode 215H, and a capacitor 216H.

An end of the inductor 214H and an end of the capacitor 216H are connected to the node N2. The FET 212H is connected between the other end of the inductor 214H and the power source 101. The FET 212H switches connection and disconnection between the inductor 214H and the power source 101. A cathode of the diode 215H is connected between the other end of the inductor 214H and the FET 212H. An anode of the diode 215H and the other end of the capacitor 216H are connected to the isolation switching element 213H.

The neutral point potential setting circuit 160L includes a step-down circuit 220L, an isolation switching element 223L, and a resistor 228L. The step-down circuit 220L is connected to the node N3. The isolation switching element 223L switches connection and disconnection between the step-down circuit 220L and the GND.

The step-down circuit 220L includes a FET 222L, an inductor 224L, a diode 225L, and a capacitor 226L.

An end of the inductor 224L and an end of the capacitor 226L are connected to the node N3. The FET 222L is connected between the other end of the inductor 224L and the power source Vcc. The FET 222L switches connecting and disconnecting between the inductor 224L and the power source Vcc. A cathode of the diode 225L is connected between the other end of the inductor 224L and the FET 222L. An anode of the diode 225L and the other end of the capacitor 226L are connected to the isolation switching element 223L. Resistor 228L is connected between the node N3 and the GND.

The neutral point potential setting circuit 160H includes a step-down circuit 220H and an isolation switching element 223H. The step-down circuit 220H is connected to the node N4. The isolation switching element 223H switches connection and disconnection between the step-down circuit 220H and the GND.

The step-down circuit 220H includes a FET 222H, an inductor 224H, a diode 225H, and a capacitor 226H.

An end of the inductor 224H and an end of the capacitor 226H are connected to the node N4. The FET 222H is connected between the other end of the inductor 224H and the power source 101. The FET 222H switches connection and disconnection between the inductor 224H and the power source 101. A cathode of the diode 225H is connected between the other end of the inductor 224H and the FET 222H. An anode of the diode 225H and the other end of the capacitor 226H are connected to the isolation switching element 223H.

The FET 212L 212H, 222L, 222H is, for example, a field-effect transistor (typically a MOSFET). Also, an IGBT may be used as the FET 212L 212H, 222L, and 222H. As the isolation switching elements 213L, 213H, 223L, and 223H, for example, a field-effect transistor (typically, a MOSFET) or a IGBT can be used. In this specification, an example in which an FET is used as the isolation switching element will be described, and in the following description, the isolation switching element may be referred to as an FET. The FET 212L 212H, 222L, 222H, 213L, 213H, 223L, 223H may be controlled by, for example, a microcontroller or a dedicated driver. In this example, the FET 212L 212H, 222L, 222H, 213L, 213H, 223L, 223H is controlled by the control circuit 300 (primarily the microcontroller 340).

In the electric power conversion apparatus 100 shown in FIG. 13, there are controls in normal state and in abnormal state. The control circuit 300 can switch the control for the electric power conversion apparatus 100 from the control in normal state to the control in abnormal state.

First, a control method of the electric power conversion apparatus 100 in normal state will be described. In the control in normal state, the FET 212H 222H is turned on. The FET 212L, 222L, 213L, 213H, 223L, 223H is turned off. In this state, the control circuit 300 drives the motor 200 by performing three-phase current carrying control using both the first and second inverters 110 and 140. The method of the three-phase current carrying control is as described with reference to FIG. 7 and Table 1. For example, the control circuit 300 controls the switching operation of each FET of the bridge circuits L and R by the PWM control such that the current waveform shown in FIG. 7 is obtained.

Next, a specific example of a control method for the electric power conversion device 100 in abnormal state will be described.

Figure 14:
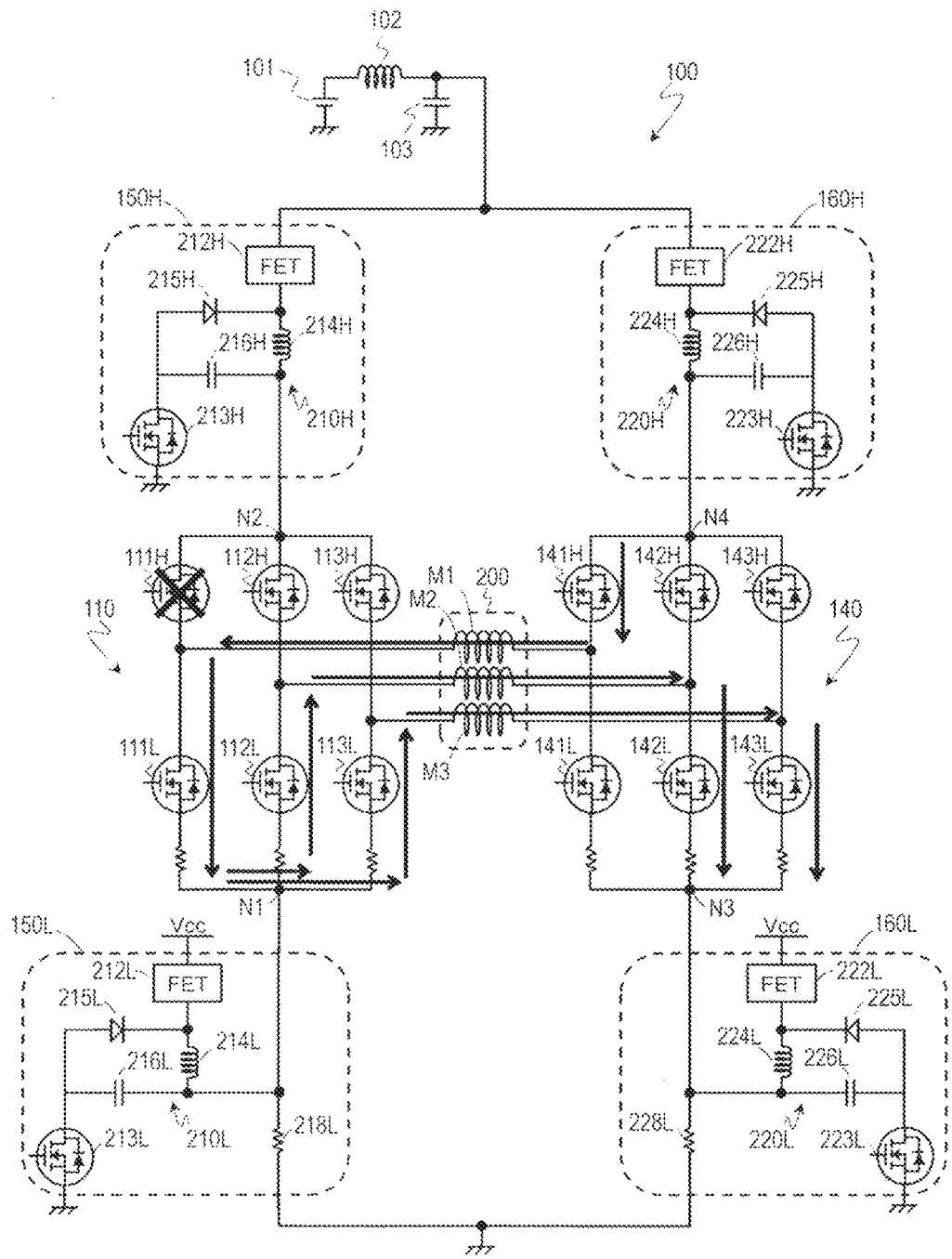
FIG. 14 is a mimetic diagram showing an electric power conversion apparatus in abnormal state according to an example embodiment of the present disclosure.

FIG. 14 is a mimetic diagram showing the electric power conversion apparatus 100 in abnormal state. First, it will be described that a control when the three high-side switching elements include an open-faulty switching element, in the bridge circuit of the first inverter 110.

In this example, it is assumed that the FET 111H of the high-side switching elements FET 111H, 112H, and 113H of the first inverter 110 is open-faulty. Also, even when the FET 112H or 113H is open-faulty, the electric power conversion apparatus 100 can be controlled by a control method described below.

When the high-side switching element 111H is open-faulty, the control circuit 300 turns off all the high-side switching elements 112H and 113H other than the open-faulty high-side switching element 111H in the first inverter 110. The control circuit 300 turns on all the low-side switching elements 111L, 112L, and 113L of the first inverter 110. By turning on all of the three low-side switching elements 111L, 112L, and 113L, a neutral point is configured in the node N1 in the low-side side.

The control circuit 300 turns off the FET 222L 223L, 213H, 223H. The FET 212H, 222H is turned on. Also, the FET 212H may be off.

The control circuit 300 turns on the FET 213L. As a result, the diode 215L and the capacitor 216L are connected to the GND. The control circuit 300 repeatedly switches between on and off for the FET 212L, and starts an operation of the step-down circuit 210L.

By all three low-side switching elements 111L, 112L, and 113L become conductive, the node N1 of the low-side side functions as a neutral point of each winding. The electric power conversion 100 drives the motor 200 by using the neutral point which is configured in the low-side side of the first inverter 110 and the second inverter 140.

FIG. 14 mimetically shows the flow of current in the electric power conversion apparatus 100 when a neutral point is configured in the node N1. FIG. 14 shows, as an example, the flow of current at a motor electrical angle of 270° with solid arrows. Each of the three solid arrows represents a current flowing from the power source 101 to the motor 200. The flow of current in the electric power conversion apparatus 100 shown in FIG. 14 is the same as the flow of current shown in FIG. 8. For example, the control circuit 300 controls switching operation of each FET of the second inverter 140 (bridge circuit R) by the PWM control such that the current waveform shown in FIG. 9 is obtained.

The step-down circuit 210L is, for example, a step-down chopper circuit. When the FET 212L is on, an output voltage of the power source Vcc is supplied to the inductor 214L, and a current flows through the inductor 214L. When the FET 212L is off, a current flows from the GND to the inductor 214L through a diode 215L. By repeatedly switching between on and off for the FET 212L, the step-down circuit 210L generates a voltage lower than the power source Vcc, and supplies the voltage to the neutral point (the node N1). By adjusting a duty ratio of the FET 212L (a ratio of the time to turn on and the time to turn off), the potential supplied to the neutral point can be set to an arbitrary value.

When the potential supplied from the step-down circuit 210L to the neutral point is constant, the potential at the neutral point can be fixed to a fixed value. As a result, the power loss in the electric power conversion apparatus 100 can be reduced.

Further, the control circuit 300 can supply a variable potential to the neutral point by changing a duty ratio of the FET 212L. By changing the potential supplied to the neutral point according to the state of the electric power conversion apparatus 100, the power loss can be reduced.

By setting the potential of the neutral point to an arbitrary value, a torque ripple, an average torque, and efficiency of the motor can be improved.

Figure 15:
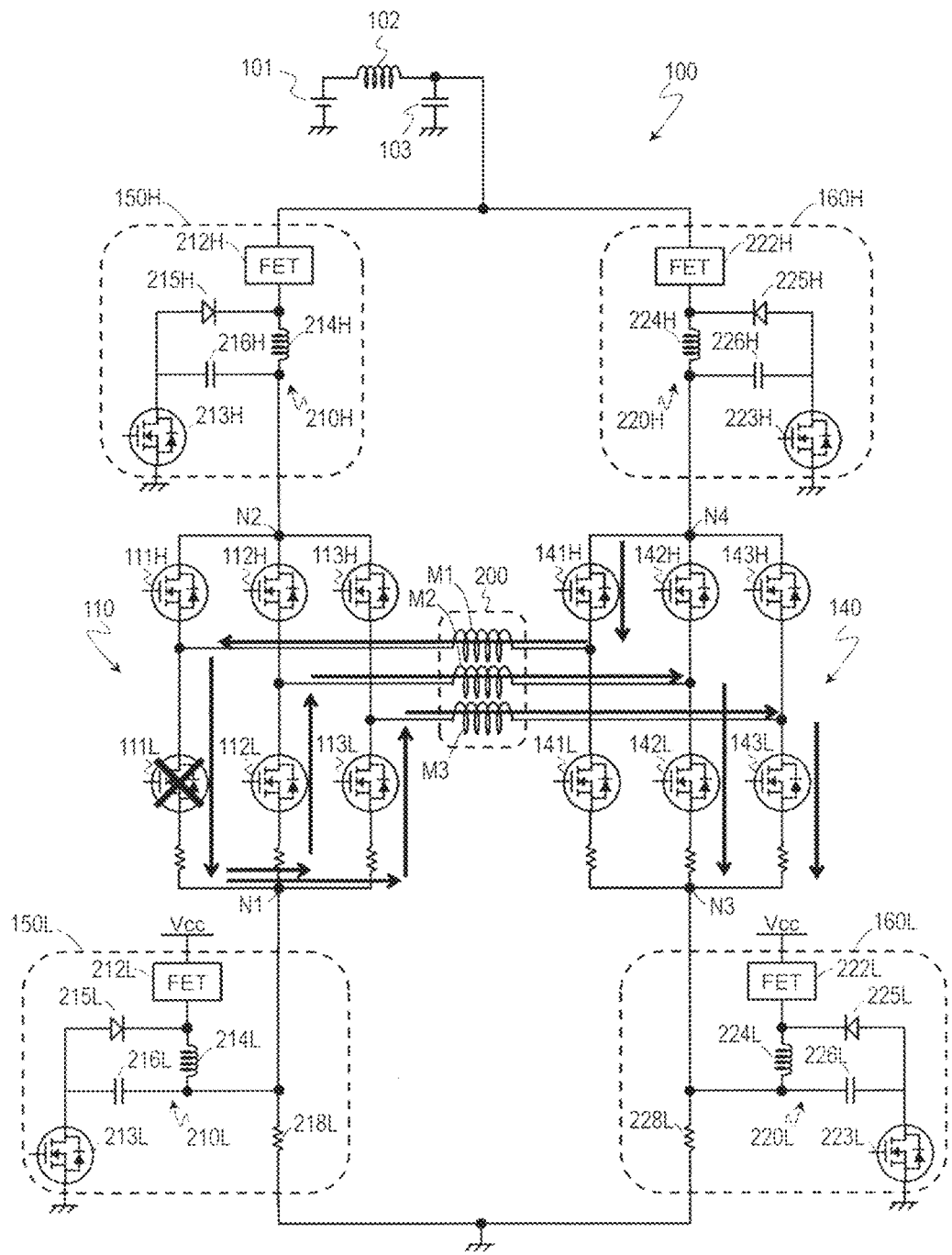
FIG. 15 is a mimetic diagram showing another example of an electric power conversion apparatus in abnormal state according to an example embodiment of the present disclosure.

Next, it will be described that a control when three low-side switching element include a short-faulty switching element, in the bridge circuit of the first inverter 110. FIG. 15 is a mimetic diagram showing another example of the electric power conversion apparatus 100 in abnormal state.

In this example, it is assumed that the FET 111L of the low-side switching elements FET 111L, 112L, and 113L of the first inverters 110 is short-faulty. Also, even when the FET 112L or 113L is short-faulty, the electric power conversion 100 can be controlled by a control method described below.

When the low-side switching element 111L is short-faulty, the control circuit 300 turns on all the low-side switching elements 112L and 113L other than the short-faulty low-side switching element 111L in the first inverter 110. The control circuit 300 turns off all the high-side switching elements 111H, 112H, and 113H of the first inverter 110. The control circuit 300 turns off the FET 222L 223L, 213H, 223H. The FET 212H, 222H is turned on. Also, the FET 212H may be off.

The control circuit 300 turns on the FET 213L. As a result, the diode 215L and the capacitor 216L are connected to the GND. The control circuit 300 repeatedly switches between on and off for the FET 212L.

By all three low-side switching elements 111L, 112L, and 113L become conductive, the node N1 of the low-side side functions as a neutral point of each winding. The electric power conversion 100 drives the motor 200 by using the neutral point which is configured in the low-side side of the first inverter 110 and the second inverter 140.

FIG. 15 mimetic shows the flow of current in the electric power conversion apparatus 100 when a neutral point is configured in the node N1. FIG. 15 shows, as an example, the flow of current at a motor electrical angle of 270° with solid arrows. Each of the three solid arrows represents a current flowing from the power source 101 to the motor 200.

The flow of current in the electric power conversion apparatus 100 shown in FIG. 15 is the same as the flow of current shown in FIG. 14. For example, the control circuit 300 controls the switching operation of each FET of the second inverter 140 (the bridge circuit R) by the PWM control such that the current waveform shown in FIG. 9 is obtained.

The step-down circuit 210L generates a voltage lower than the power source Vcc by repeatedly switching between on and off for the FET 212L, and supplies the voltage to the neutral point (the node N1). By adjusting a duty ratio of the FET 212L, the potential supplied to the neutral point can be set to an arbitrary value.

When the potential supplied from the step-down circuit 210L to the neutral point is constant, the potential at the neutral point can be fixed to a constant value. As a result, the power loss in the electric power conversion apparatus 100 can be reduced.

Further, the control circuit 300 can supply a variable potential to the neutral point by changing the duty ratio of the FET 212L. By changing the potential supplied to the neutral point according to the state of the electric power conversion 100, the power loss can be reduced.

Figure 16:
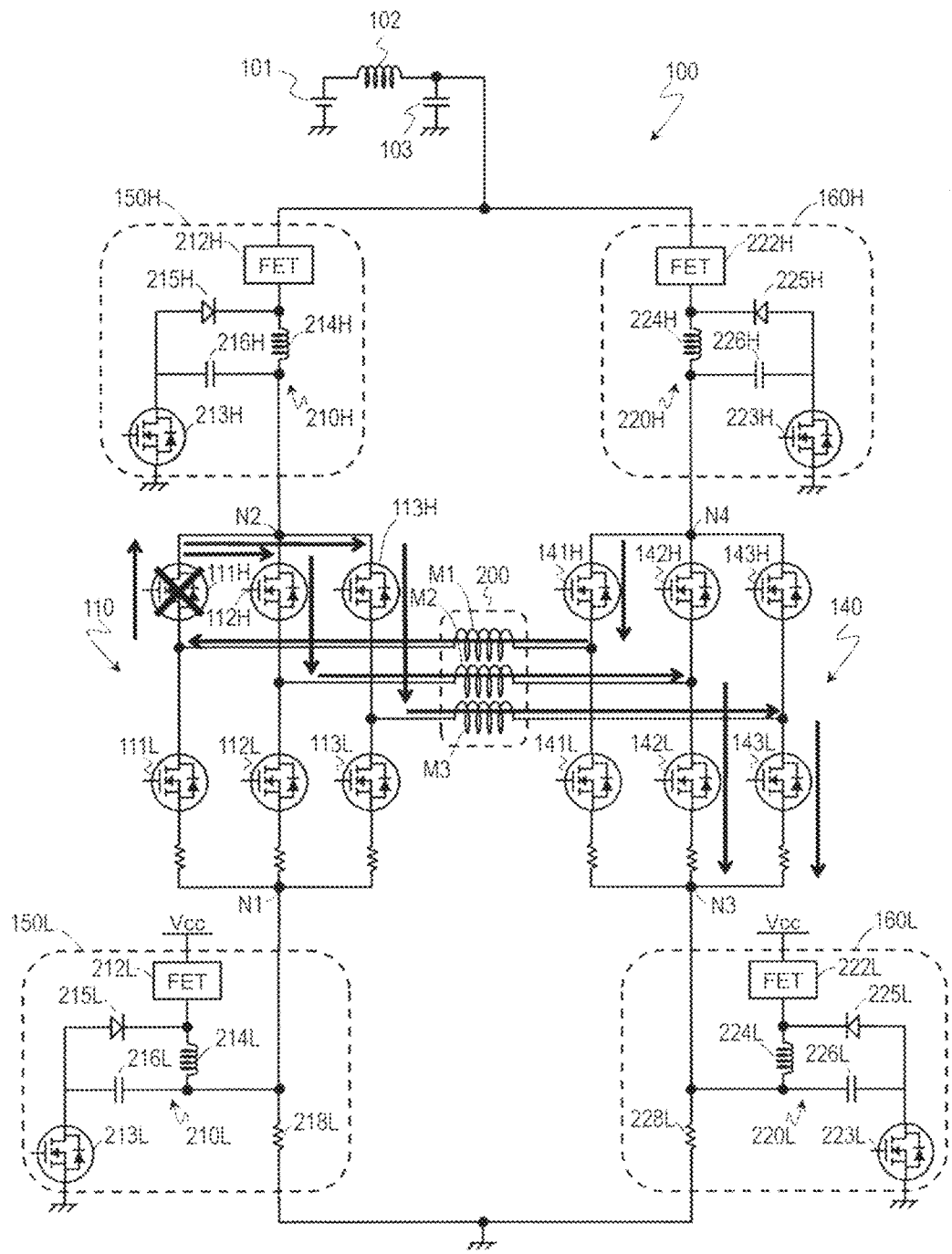
FIG. 16 is a mimetic diagram showing still another example of an electric power conversion apparatus in abnormal state according to an example embodiment of the present disclosure.

Next, it will be described that a control when the three high-side switching elements include a short-faulty switching element in the bridge circuit of the first inverter 110. FIG. 16 is a mimetic diagram showing another example of the electric power conversion apparatus 100 in abnormal state.

In this example, it is assumed that the FET 111H is short-faulty among the high-side switching elements FET 111H, 112H, and 113H of the first inverters 110. Also, even when the FET 112H or 113H is short-faulty, the power converter 100 can be controlled by a control method described below.

When the high-side switching element 111H is short-faulty, the control circuit 300 turns on all the high-side switching elements 112H and 113H other than the short-faulty high-side switching element 111H in the first inverter 110. The control circuit 300 turns off all the low-side switching elements 111L, 112L, and 113L of the first inverter 110. By all the three high-side switching elements 111H, 112H, and 113H become conductive, a neutral point is configured in the node N2 in the high-side side.

The control circuit 300 turns off the FET 212L 213L, 222L, 223L, 223H. The FET 222H is turned on.

The control circuit 300 turns on the FET 213H. As a result, the diode 215H and the capacitor 216H are connected to the GND. The control circuit 300 repeatedly switches between on and off for the FET 212H, and starts an operation of the step-down circuit 210H.

By all the three high-side switching elements 111H, 112H, and 113H become conductive, the node N2 of the high-side side functions as a neutral point of each winding. The electric power conversion 100 drives the motor 200 by using the neutral point which is configured in the high-side side of the first inverter 110 and the second inverter 140.

FIG. 16 mimetically shows the flow of current in the electric power conversion apparatus 100 when a neutral point is configured in the node N2. FIG. 16 shows, as an example, the flow of current at a motor electrical angle of 270° with solid arrows. Each of the three solid arrows represents a current flowing from the power source 101 to the motor 200. The flow of current in the electric power conversion apparatus 100 shown in FIG. 16 is the same as the flow of current shown in FIG. 12. For example, the control circuit 300 controls the switching operation of each FET of the second inverter 140 (the bridge circuit R) by the PWM control such that the current waveform shown in FIG. 9 is obtained.

The step-down circuit 210H is, for example, a step-down chopper circuit. When the FET 212H is on, an output voltage of the power source 101 is supplied to the inductor 214H, and a current flows through the inductor 214H. When the FET 212H is off, a current flows from the GND to the inductor 214H through the diode 215H. By repeatedly switching between on and off for the FET 212H, the step-down circuit 210H generates a voltage lower than the power source 101, and supplies the voltage to the neutral point (the node N2). By adjusting a duty ratio of the FET 212H, a potential supplied to the neutral point can be set to an arbitrary value.

When the potential supplied from the step-down circuit 210H to the neutral point is constant, the potential at the neutral point can be fixed to a constant value. As a result, the power loss in the electric power conversion apparatus 100 can be reduced.

Further, the control circuit 300 can supply a variable potential to the neutral point by changing the duty ratio of the FET 212H. By changing the potential supplied to the neutral point according to a state of the electric power conversion apparatus 100, the power loss can be reduced.

Figure 17:
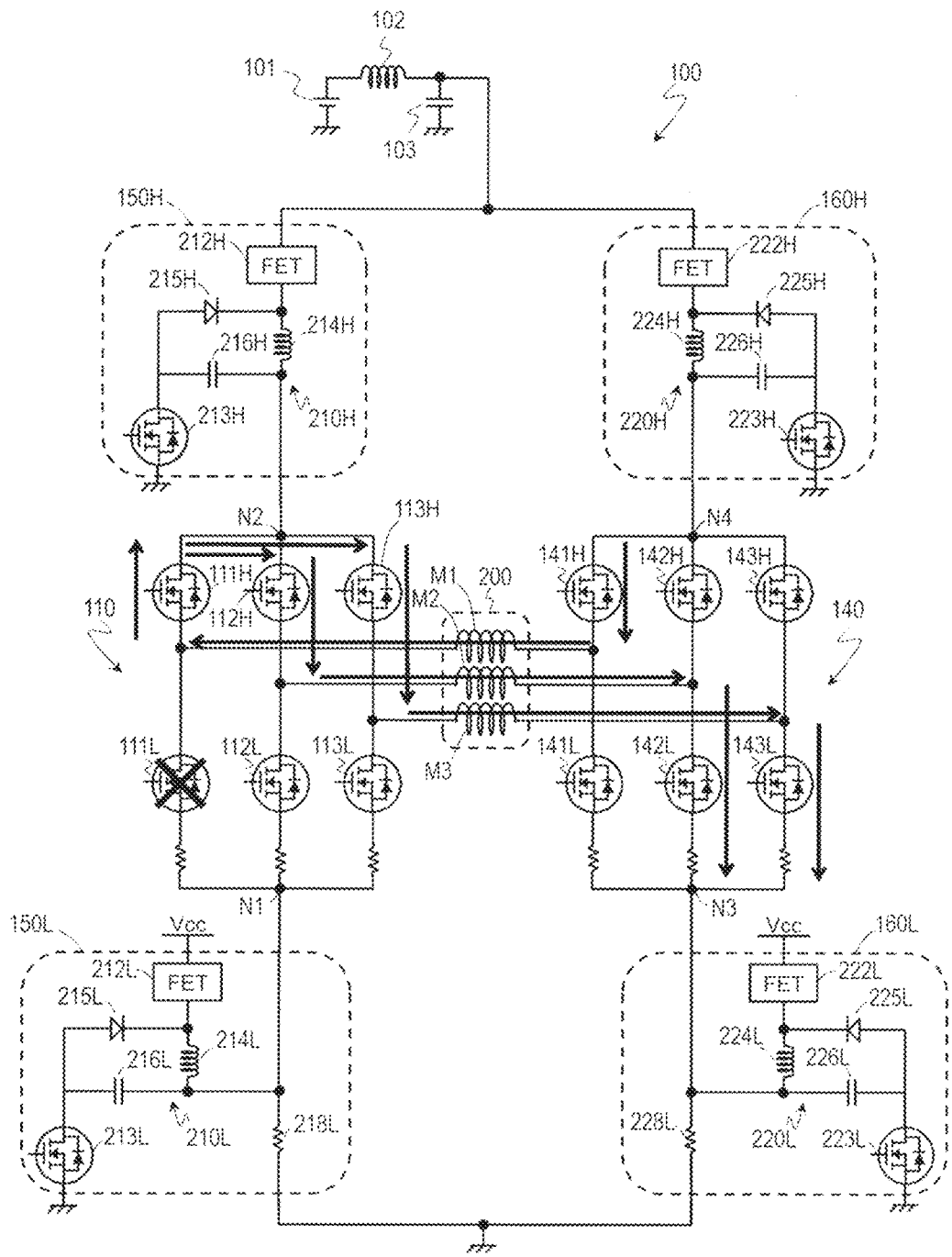
FIG. 17 is a mimetic diagram showing still another example of an electric power conversion apparatus in abnormal state according to an example embodiment of the present disclosure.

Next, it will be described a control when the three low-side switching elements include an open-faulty switching element, in the bridge circuit of the first inverter 110. FIG. 17 is a mimetic diagram showing another example of the electric power conversion apparatus 100 in abnormal state.

In this example, it is assumed that the FET 111L of the low-side switching elements FET 111L, 112L, and 113L of the first inverter 110 is open-faulty. Also, even when the FET 112L or 113L is open-faulty, the electric power conversion apparatus 100 can be controlled by a control method described below.

When the low-side switching element 111L is open-faulty, the control circuit 300 turns off all the low-side switching elements 112L and 113L other than the open-faulty low-side switching element 111L in the first inverter 110. The control circuit 300 turns on all the high-side switching elements 111H, 112H, and 113H of the first inverter 110. By all three high-side switching elements 111H, 112H, and 113H become conductive, a neutral point is configured in the node N2 of the high-side side.

The control circuit 300 turns off the FET 212L 213L, 222L, 223L, 223H. The FET 222H is turned on.

The control circuit 300 turns on the FET 213H. As a result, the diode 215H and the capacitor 216H are connected to the GND. The control circuit 300 repeatedly switches between on and off for the FET 212H, and starts an operation of the step-down circuit 210L.

By all three high-side switching elements 111H, 112H, and 113H become conductive, the node N2 of the high-side side functions as a neutral point of each winding. The electric power conversion 100 drives the motor 200 by using the neutral point which is configured in the high-side side of the first inverter 110 and the second inverter 140.

FIG. 17 mimetically shows the flow of current in the electric power conversion apparatus 100 when a neutral point is configured in the node N2. FIG. 17 shows, as an example, the flow of current at a motor electrical angle of 270° with solid arrows. Each of the three solid arrows represents a current flowing from the power source 101 to the motor 200. The flow of current in the electric power conversion apparatus 100 shown in FIG. 17 is the same as the flow of current shown in FIG. 11. For example, the control circuit 300 controls a switching operation of each FET of the second inverter 140 (the bridge circuit R) by the PWM control such that the current waveform shown in FIG. 9 is obtained.

The step-down circuit 210H generates a voltage lower than that of the power supply 101 by repeatedly switching between on and off for the FET 212H, and supplies the voltage to the neutral point (the node N2). By adjusting a duty ratio of the FET 212H, the potential supplied to the neutral point can be set to an arbitrary value.

When a potential supplied from the step-down circuit 210H to the neutral point is constant, the potential at the neutral point can be fixed to a constant value. As a result, the power loss in the electric power conversion apparatus 100 can be reduced.

Further, the control circuit 300 can supply a variable potential to the neutral point, by changing the duty ratio of the FET 212H. By changing the potential supplied to the neutral point according to a state of the electric power conversion 100, the power loss can be reduced.

In the above description of FIGS. 13 to 17, the first inverter 110 of the two inverters is treated as a faulty inverter, and the second inverter 140 is treated as a normal inverter. In a case where the second inverter 140 is a faulty inverter and the first inverter 110 is a normal inverter, a control in abnormal state can be performed similarly to the above. In this case, the control of the first inverter 110, the second inverter 140, and the neutral point potential setting circuits 150L, 150H, 160L, and 160H is reversed from the control described above.

More specifically, when the second inverter 140 is a faulty inverter, the control of the first inverter 110 and the second inverter 140 is reversed from the above control. A control of the neutral point potential setting circuit 150L and the neutral point potential setting circuit 160L is reversed from the above control. A control of the neutral point potential setting circuit 150H and the neutral point potential setting circuit 160H is reversed from the above control. A neutral point is configured in the second inverter 140, and the motor 200 can be driven using the neutral point and the first inverter 110.

Next, it will be described that a modification example of the circuit configuration of the electric power conversion apparatus 100 with reference to FIGS. 18 to 21.

In the above example embodiment, the electric power conversion apparatus 100 includes four neutral point potential setting circuits 150L, 150H, 160L, and 160H, but the present disclosure is not limited thereto. The power converter 100 may include at least one of the neutral point potential setting circuits 150L, 150H, 160L, and 160H.

Figure 18:
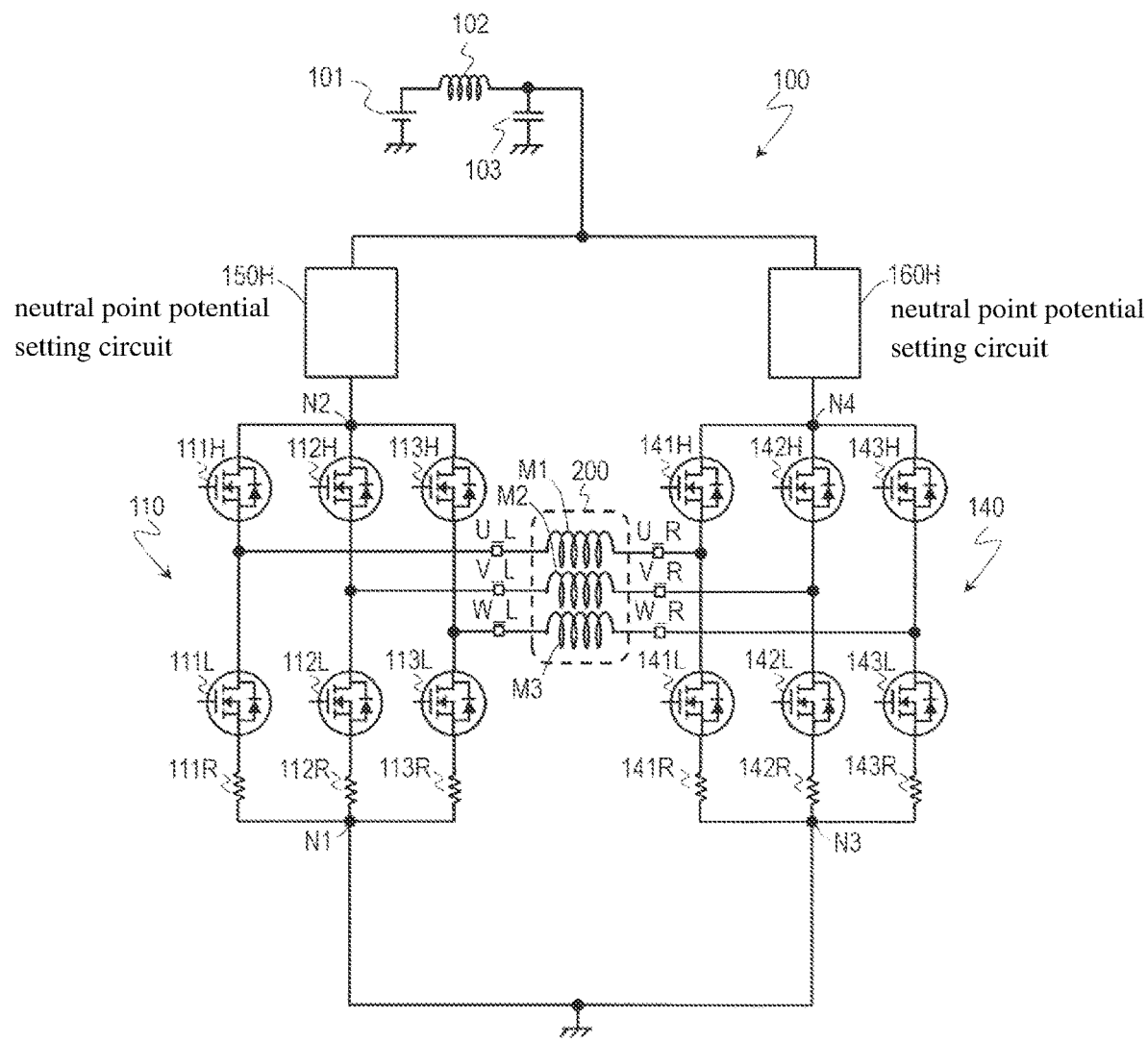
FIG. 18 is a mimetic diagram showing an electric power conversion apparatus including two neutral point potential setting circuits according to an example embodiment of the present disclosure.

FIG. 18 shows a circuit configuration of an electric power conversion apparatus 100 including neutral point potential setting circuits 150H and 160H of four neutral point potential setting circuits 150L, 150H, 160L, and 160H. According to this modification example, when a neutral point is configured in the node N2, an arbitrary potential can be supplied from the neutral point potential setting circuit 150H to the neutral point. Also, when a neutral point is configured in the node N4, an arbitrary potential can be supplied from the neutral point potential setting circuit 160H to the neutral point.

Figure 19:
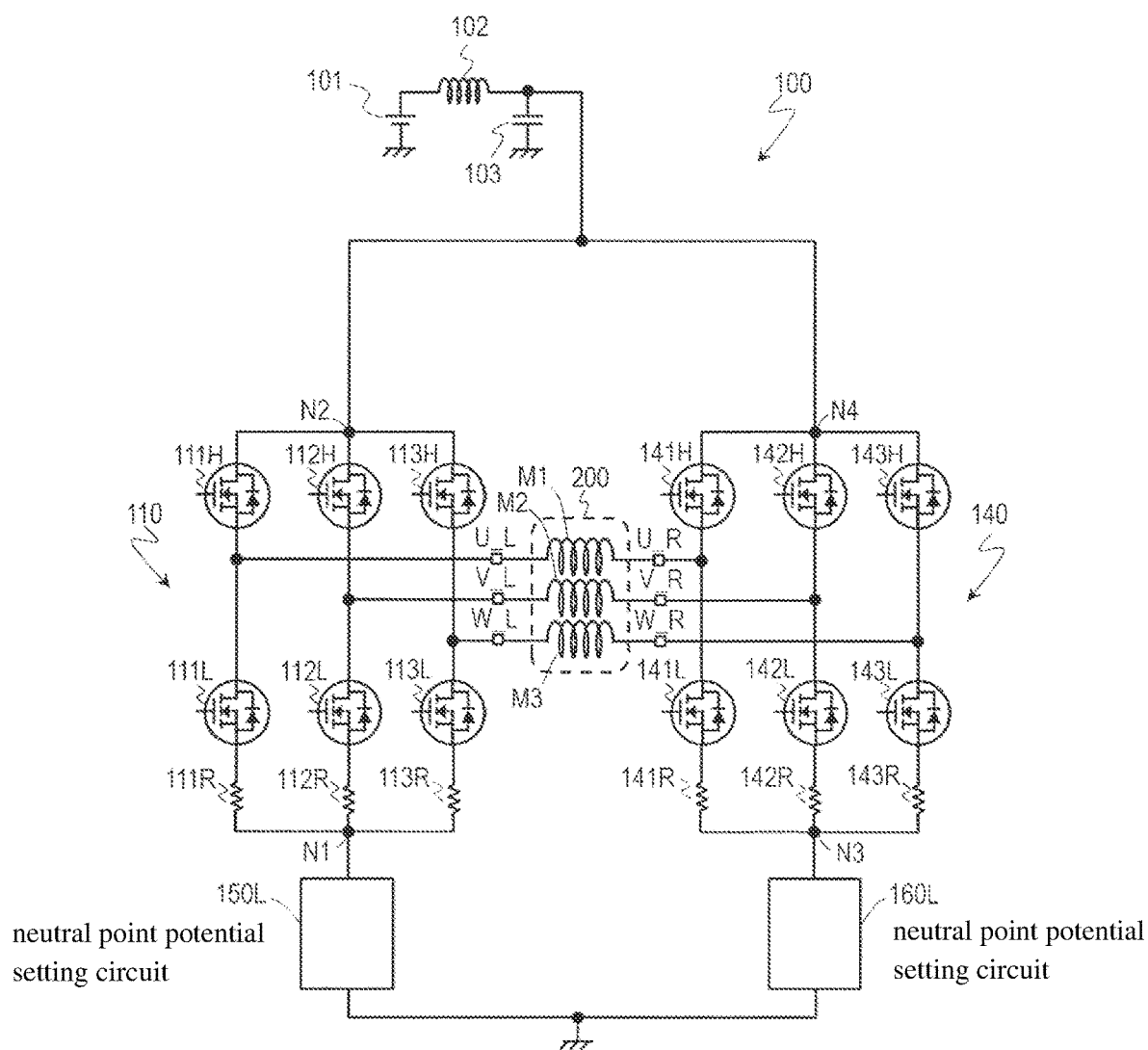
FIG. 19 is a mimetic diagram showing another example of an electric power conversion including two neutral point potential setting circuits according to an example embodiment of the present disclosure.

FIG. 19 shows a circuit configuration of an electric power conversion device 100 including neutral point potential setting circuits 150L and 160L of four neutral point potential setting circuits 150L, 150H, 160L, and 160H. According to this modified example, when a neutral point is configured in the node N1, an arbitrary potential can be supplied from the neutral point potential setting circuit 150L to the neutral point. When a neutral point is configured in the node N3, an arbitrary potential can be supplied from the neutral point potential setting circuit 160L to the neutral point.

Figure 20:
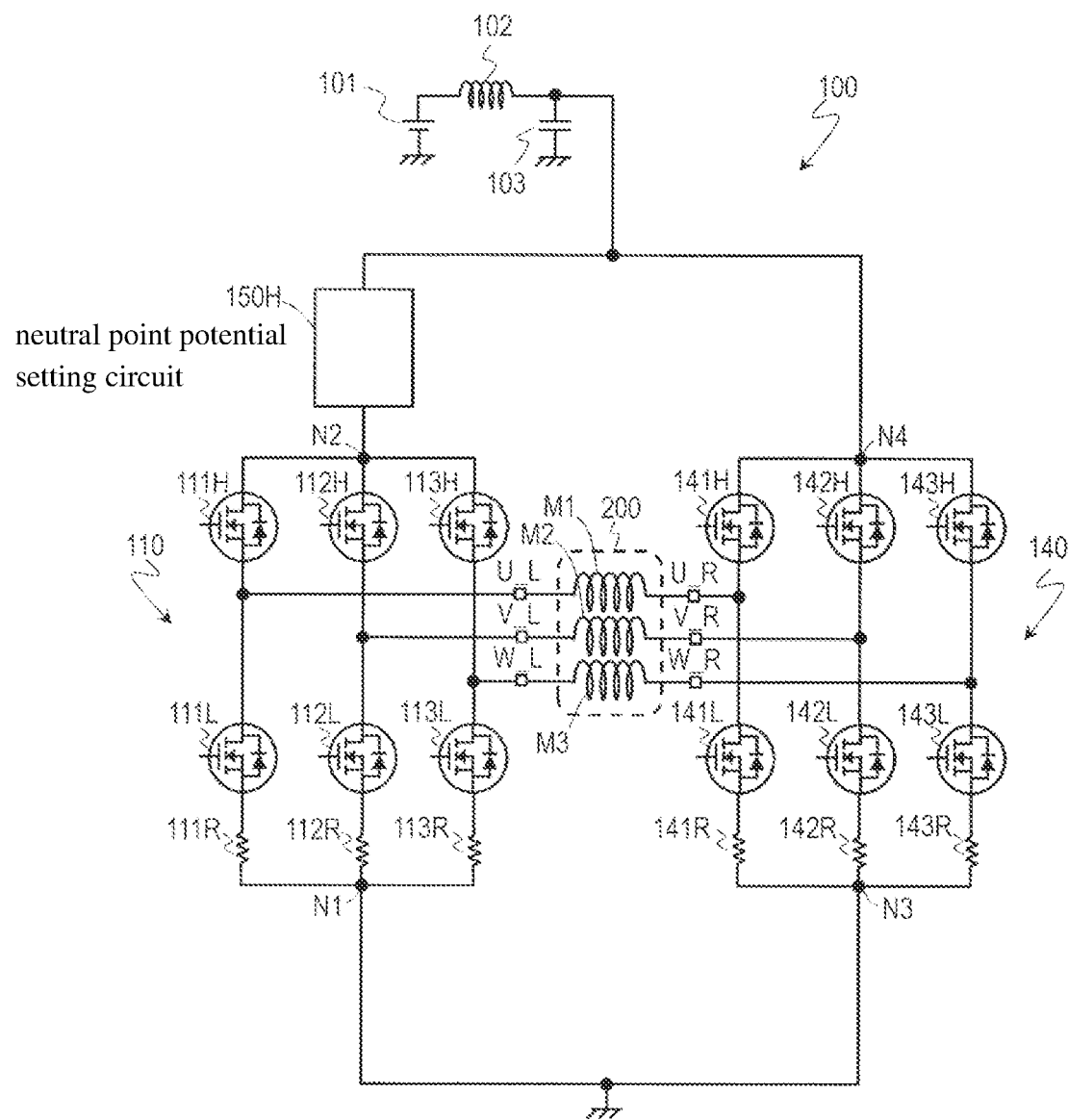
FIG. 20 is a mimetic diagram showing an electric power conversion apparatus including one neutral point potential setting circuit according to an example embodiment of the present disclosure.

FIG. 20 shows a circuit configuration of the electric power conversion apparatus 100 including the neutral point potential setting circuit 150H of the four neutral point potential setting circuits 150L, 150H, 160L, and 160H. According to this modified example, when a neutral point is configured in the node N2, an arbitrary potential can be supplied from the neutral point potential setting circuit 150H to the neutral point.

Figure 21:
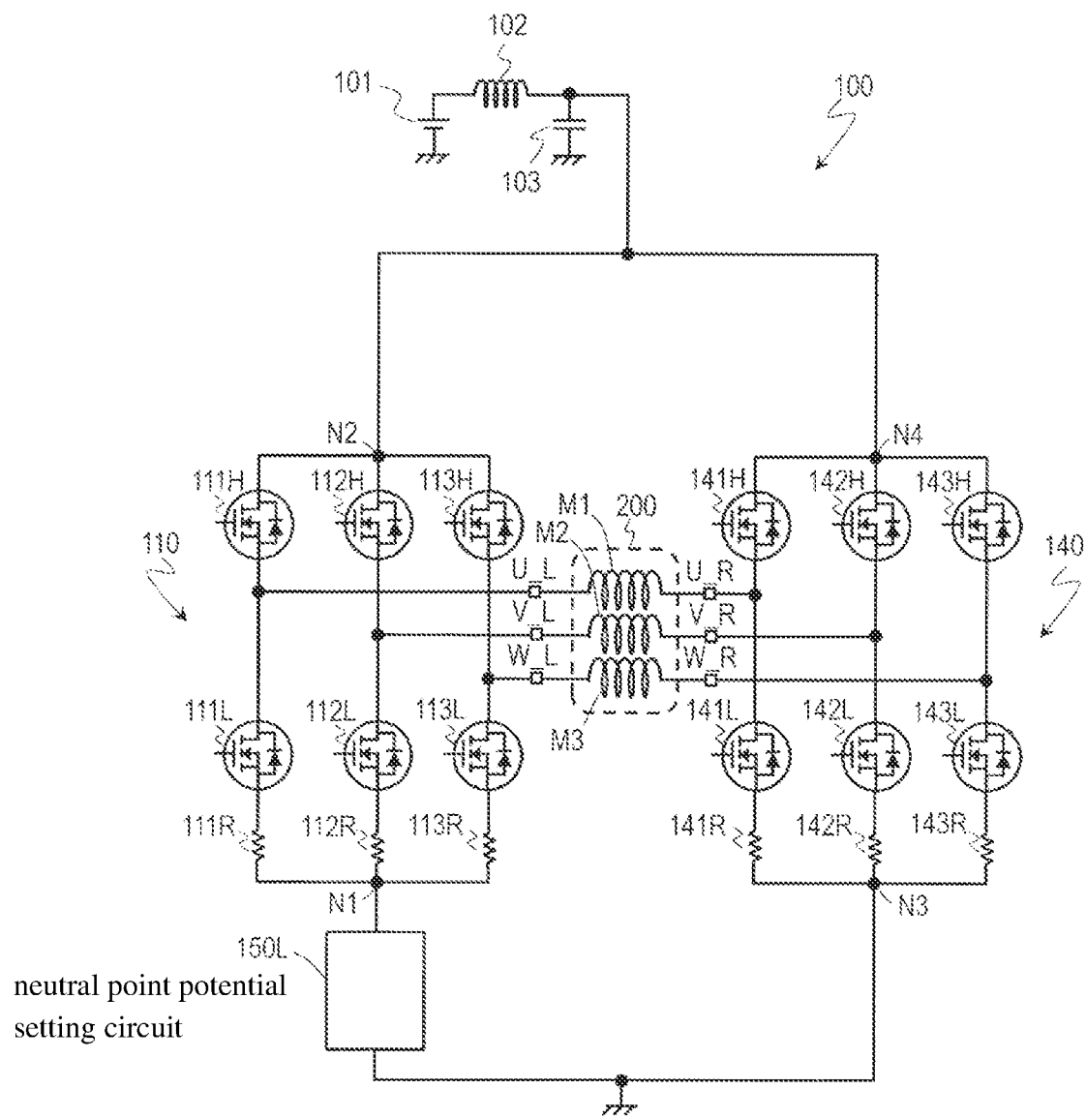
FIG. 21 is a mimetic diagram showing another example of an electric power conversion including one neutral point potential setting circuit according to an example embodiment of the present disclosure.

FIG. 21 shows a circuit configuration of the electric power conversion apparatus 100 including the neutral point potential setting circuit 150L of the four neutral point potential setting circuits 150L, 150H, 160L, and 160H. According to this modified example, when a neutral point is configured in the node N1, an arbitrary potential can be supplied from the neutral point potential setting circuit 150L to the neutral point.

A vehicle such as an automobile is generally provided with an electric motion power steering apparatus. The electric motion power steering apparatus generates an auxiliary torque for assisting a steering torque of a steering system generated by operating a steering wheel by a driver. The auxiliary torque is generated by an auxiliary torque device, and a load on an operation of the driver can be reduced. For example, the auxiliary torque device includes a steering torque sensor, an ECU, a motor, a speed reduction device, and the like. The steering torque sensor detects a steering torque in the steering system. The ECU generates a drive signal based on a detection signal of the steering torque sensor. The motor generates an auxiliary torque according to the steering torque based on the drive signal, and transmits the auxiliary torque to the steering system through the speed reduction device.

Figure 22:
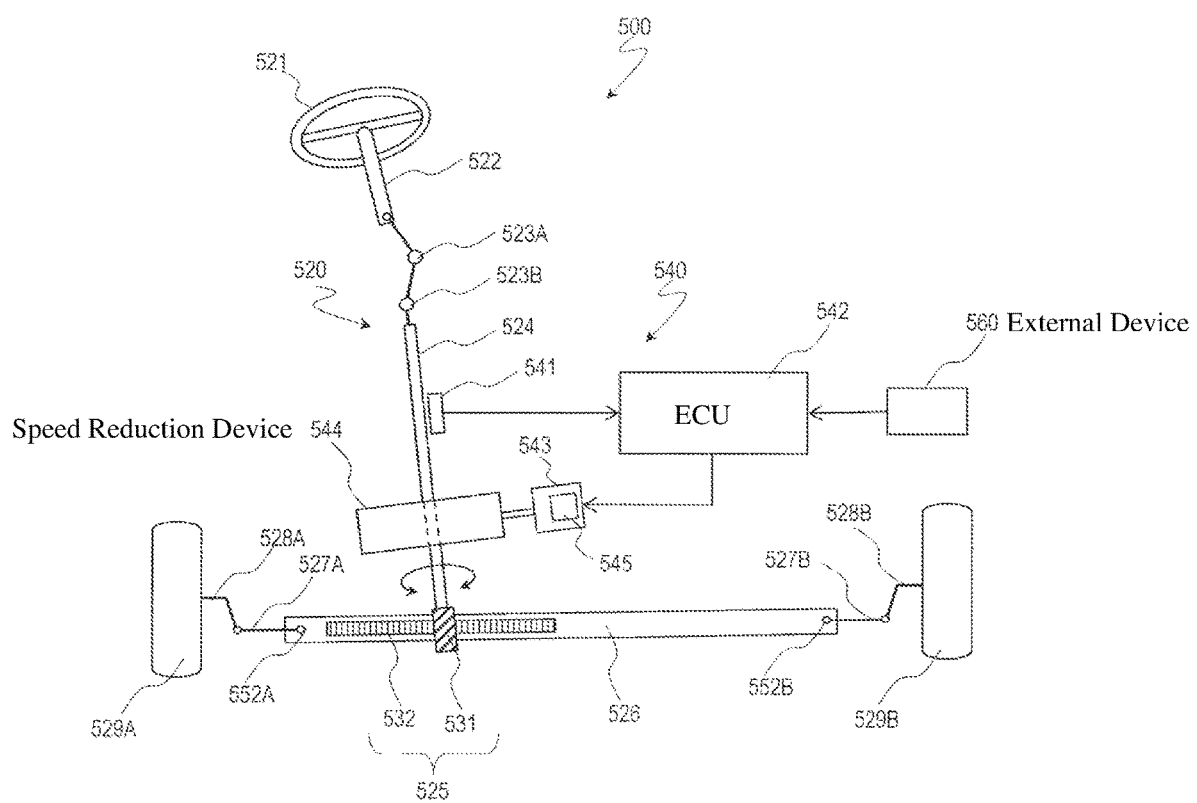
FIG. 22 is a mimetic diagram showing an electric motion power steering apparatus according to an example embodiment of the present disclosure.

The motor drive unit 400 of the present disclosure is preferably used in an electric motion power steering apparatus. FIG. 22 mimetically shows an electric motion power steering apparatus 500 according to the present example embodiment. The electric motion power steering apparatus 500 includes a steering system 520 and an auxiliary torque device 540.

The steering system 520 includes, for example, a steering handle 521, a steering shaft 522 (also referred to as a "steering column"), universal joints 523A and 523B, a rotation shaft 524 (also referred to as a "pinion shaft" or an "input shaft"), a rack and pinion device 525, a rack shaft 526, left and right ball joints 552A and 552B, tie rods 527A and 527B, knuckles 528A and 528B, and left and right steering wheels (e.g., left and right front wheels) 529A and 529B. The steering handle 521 is connected to the rotation shaft 524 through the steering shaft 522 and the universal joints 523A and 523B. The rack shaft 526 is connected to the rotation shaft 524 through the rack and pinion device 525. The rack and pinion device 525 includes a pinion 531 provided in the rotation shaft 524, and a rack 532 provided in the rack shaft 526. The right steering wheel 529A is connected to a right end of the rack shaft 526 through the ball joint 552A, the tie rod 527A, and the knuckle 528A in this order. Similar to the right side, the left steering wheel 529B is connected to a left end of the rack shaft 526 through the ball joint 552B, the tie rod 527B, and the knuckle 528B in this order. Here, the right side and the left side respectively coincide with a right side and a left side as viewed from the driver seated in the seat.

According to the steering system 520, the steering torque is generated by the driver operating the steering handle 521, and is transmitted to the left wheel 529A and the right steering wheel 529B through the rack and pinion device 525. As a result, the driver can operate the left steering wheel 529A and the right steering wheel 529B.

The assist torque device 540 includes, for example, a steering torque sensor 541, a ECU 542, a motor 543, a speed reduction device 544, and an electric power conversion apparatus 545. The auxiliary torque device 540 applies an auxiliary torque to the steering system 520 extending from the steering handle 521 to the left and right steering wheels 529A and 529B. Also, the auxiliary torque may be referred to as an "additional torque".

As an ECU 542, the control circuit 300 according to the example embodiment may be used, and as the electric power conversion apparatus 545, the electric power conversion apparatus 100 according to the example embodiment may be used. Also, the motor 543 corresponds to the motor 200 in the example embodiment. The motor drive unit 400 according to the example embodiment may be suitably used, as an electromechanical unit including the ECU 542, the motor 543 and the electric power conversion apparatus 545.

The steering torque sensor 541 detects the steering torque of the steering system 520 applied by the steering handle 521. The ECU 542 generates a drive signal for driving the motor 543 based on a detected signal (hereinafter, referred to as "a torque signal") from the steering torque sensor 541. The motor 543 generates an auxiliary torque corresponding to the steering torque based on the drive signal. The auxiliary torque is transmitted to the rotation shaft 524 of the steering system 520 through the speed reduction device 544. The reduction device 544 is, for example, a worm gear device. Also, the auxiliary torque is transmitted from the rotation shaft 524 to the rack and pinion device 525.

The electric motion power steering apparatus 500 may be classified into a pinion assist type, a rack assist type, a column assist type, and the like, depending on a location where the auxiliary torque is applied to the steering system 520. FIG. 22 illustrates an electric motion power steering apparatus 500 of the pinion assist type. However, the electric motion power steering apparatus 500 may be the rack assist type, the column assist type, or the like.

Not only the torque signal but also, for example, a vehicle speed signal may be inputted to the ECU 542. The external device 560 is, for example, a vehicle speed sensor. Alternatively, the external device 560 may be other ECU capable of communicating in a vehicle network such as a CAN (Controller Area Network). The ECU 542 microcontroller may control the motor 543 by a vector control or the like based on the torque signal, the vehicle speed signal, or the like.

The ECU 542 sets a target current value based on at least the torque signal. Preferably, the ECU 542 sets the target current value in consideration of the vehicle speed signal detected by the vehicle speed sensor, and in consideration of the rotor rotational signal detected by the angular sensor 320. The ECU 542 may control the drive signal (i.e., a drive current) of the motor 543 so that an actual current value detected by the current sensor 170 matches the target current value.

According to the electric motion power steering apparatus 500, the right and left steering wheels 529A and 529B may be operated by the rack shaft 526 using a combined torque obtained by adding the assist torque of the motor 543 to the steering torque of the driver. In particular, by using the motor drive unit 400 of the present disclosure in the electromechanical unit described above, there is provided the electric motion power steering apparatus including the motor drive unit which improves a quality of components and enables appropriate current control both in normal state and in abnormal state.

Example embodiments according to the present disclosure have been described above. The above description of the example embodiments is illustrative, and not restrictive of the technics of the present disclosure. In addition, an example embodiment in which the constituent elements described in the above example embodiment are appropriately combined is also possible.

Example embodiments of the present disclosure may be widely utilized in a variety of apparatuses including various motors, such as vacuum cleaners, dryers, sealing fans, washing machines, refrigerators, and electric motion power steering systems.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. An electric power conversion apparatus that converts electric power from a power source into an electric power supplied to a motor including an n-phase winding, n being an integer greater than or equal to 3, the electric power conversion apparatus comprising:
   a first inverter electrically connected to a first end of each of the phase windings of the motor;
   a second inverter electrically connected to a second end of each of the phase windings of the motor; and
   a first neutral point potential setting circuit electrically connected to the first inverter to set a potential of a neutral point of the first inverter when the first inverter is determined to be in an abnormal state; wherein
   each of the first inverter and the second inverter includes n legs, n being an integer greater than or equal to 3, including n low-side switching elements, n being an integer greater than or equal to 3, and n high-side switching elements, n being an integer greater than or equal to 3;

the first neutral point potential setting circuit includes:
a first voltage dividing circuit including a first resistor and a second resistor electrically connected in series to each other; and
a first isolation switching element switching electrical connection and disconnection between the first voltage dividing circuit and a power source or a ground;

a node between the first resistor and the second resistor is electrically connected to a first node connected to the n low-side switching elements, or a second node electrically connected to the n high-side switching elements;

the first resistor is electrically connected between the first node and the ground;

the second resistor is electrically connected between the first node and the first isolation switching element; and the first isolation switching element is electrically connected between the second resistor and the power source.

2. The electric power conversion apparatus of claim 1, wherein
when the n low-side switching elements of the first inverter include a short-faulty low-side switching element:
all of the low-side switching elements other than the short-faulty low-side switching element in the first inverter are turned on to define the neutral point;
all the n high-side switching elements of the first inverter are turned off;
the first isolation switching element is turned on;
a potential between the first resistor and the second resistor is supplied to the neutral point configured by turning on the low-side switching elements; and
the electric power conversion apparatus performs an electric power conversion using the second inverter.

3. The electric power conversion apparatus of claim 1, when the n high-side switching elements of the first inverter include an open-faulty high-side switching element:
all the high-side switching elements other than the open-faulty high-side switching element in the first inverter are turned off;
all the n low-side switching elements of the first inverter are turned on to configure the neutral point;
the first isolation switching element is turned on;
a potential between the first resistor and the second resistor is supplied to the neutral point configured by turning on the low-side switching element; and
the electric power conversion apparatus performs an electric power conversion using the second inverter.

4. The electric power conversion apparatus of claim 1, further comprising:
a second neutral point potential setting circuit electrically connected to the first inverter; wherein
the second neutral point potential setting circuit includes:
a second voltage dividing circuit including a third resistor and a fourth resistor which are electrically connected in series; and
a second isolation switching element switching electrical connection and disconnection between the second voltage dividing element and the ground;
the second voltage dividing element is electrically connected to the second node electrically connected to the n high-side switching element;
the third resistor is electrically connected between the second node and the power source;
the fourth resistor is electrically connected between the second node and the second isolation switching element;
the second isolation switching element is electrically connected between the fourth resistor and the ground.

5. The electric power conversion apparatus of claim 1, further comprising:
a second neutral point potential setting circuit electrically connected to the first inverter; wherein
the second neutral point potential setting circuit includes:
a second voltage dividing circuit including a third resistor and a fourth resistor which are electrically connected in series; and
a second isolation switching element switching electrical connection and disconnection between the second voltage dividing element and the ground;
the second voltage dividing element is electrically connected to the second node electrically connected to the n high-side switching element;
the third resistor is electrically connected between the second node and the power source;
the fourth resistor is electrically connected between the second node and the second isolation switching element;
the second isolation switching element is electrically connected between the fourth resistor and the ground.

6. The electric power conversion apparatus of claim 5, wherein
when the n low-side switching elements of the first inverter include an open-faulty low-side switching element:
all the low-side switching elements other than the open-faulty low-side switching element in the first inverter are turned off;
all the n high-side switching elements of the first inverter are turned on to configure the neutral point;
the second isolation switching element is turned on;
a potential between the third resistor and the fourth resistor is supplied to the neutral point configured by turning on the high-side switching elements; and
the electric power conversion apparatus performs an electric power conversion using the second inverter.

7. An electric power conversion apparatus that converts electric power from a power source into an electric power supplied to a motor including an n-phase winding, n being an integer greater than or equal to 3, the electric power conversion apparatus comprising:
a first inverter electrically connected to a first end of each of the phase windings of the motor;
a second inverter electrically connected to a second end of each of the phase windings of the motor; and
a first neutral point potential setting circuit electrically connected to the first inverter to set a potential of a neutral point of the first inverter when the first inverter is determined to be in an abnormal state; wherein
each of the first inverter and the second inverter includes n legs, n being an integer greater than or equal to 3, including n low-side switching elements n being an integer greater than or equal to 3, and n high-side switching elements, n being an integer greater than or equal to 3; and
the first neutral point potential setting circuit includes:
a first step-down circuit electrically connected to a first node electrically connected to the n low-side switching elements, or a second node electrically connected to the n high-side switching elements;

the first isolation switching element switching electrical connection and disconnection between the first step-down circuit and a ground;

the first step-down circuit includes a FET, an inductor, a diode, and a capacitor;

an end of the inductor and an end of the capacitor are connected to the first node or the second node;

a cathode of the diode is connected between the other end of the inductor and the FET of the diode; and an anode of the diode and the other end of the capacitor are connected to the isolation switching element.

8. The electric power conversion apparatus of claim 7, wherein the first step-down circuit is electrically connected to the first node electrically connected to the n-side switching elements.

9. The electric power conversion apparatus of claim 8, wherein when the n low-side switching elements of the first inverter include a short-faulty low-side switching element:

all the low-side switching elements other than the short-faulty low-side switching elements in the first inverter are turned on to configure the neutral point;

all the n high-side switching elements of the first inverter are turned off;

the first step-down circuit supplies a potential to the neutral point configured by turning on the low-side switching elements; and the electric power conversion apparatus performs an electric power conversion using the second inverter.

10. The electric power conversion apparatus of claim 9, wherein when the n high-side switching elements of the first inverter include an open-faulty high-side switching element:

all the high-side switching elements other than the open-faulty high-side switching element in the first inverter are turned off;

the n low-side switching elements of the first inverter are turned on to configure the neutral point;

the first step-down circuit supplies a potential to the neutral point configured by turning on the low-side switching elements; and the electric power conversion apparatus performs an electric power conversion using the second inverter.

11. The electric power conversion apparatus of claim 10, further comprising:

a second neutral point potential setting circuit electrically connected to the first inverter; wherein the second neutral point potential setting circuit includes:

a second step-down circuit electrically connected to the second node electrically connected to the n high-side switching elements; and a second isolation switching element switching electrical connection and disconnection between the second step-down circuit and ground.

12. The electric power conversion apparatus of claim 11, wherein when the n high-side switching elements of the first inverter include a short-faulty high-side switching element:

all high-side switching elements other than the short-faulty high-side switching element in the first inverter are turned on to configure the neutral point;

all the n low-side switching elements of the first inverter are turned off;

the second step-down circuit supplies a potential to the neutral point defined by turning on the high-side switching elements; and an electric power conversion is performed using the second inverter.

13. The electric power conversion apparatus of claim 12, wherein when the n low-side switching elements of the first inverter include an open-faulty low-side switching element:

all the low-side switching elements other than the open-faulty low-side switching element in the first inverter are turned off;

all the n high-side switching elements of the first inverter are turned on to define the neutral point;

the second step-down circuit supplies a potential to the neutral point configured by turning on the high-side switching elements;

the electric power conversion apparatus performs an electric power conversion using the second inverter.

14. The electric power conversion apparatus of claim 1, further comprising a third neutral point potential setting circuit electrically connected to the second inverter to set a potential of a neutral point configured in the second inverter when the second inverter is determined to be in an abnormal state.

15. The electric power conversion apparatus of claim 14, wherein the third neutral point potential setting circuit is electrically connected to a third node electrically connected to the n low-side switching elements, or a fourth node electrically connected to the n high-side switching elements.

16. The electric power conversion apparatus of claim 15, wherein the third neutral point potential setting circuit is electrically connected to the third node electrically connected to the n low-side switching elements.

17. The electric power conversion apparatus of claim 16, further comprising a fourth neutral point potential setting circuit electrically connected to the second inverter to set a potential of a neutral point configured in the second inverter when the second inverter is determined to be in an abnormal state;

the fourth neutral point potential setting circuit is electrically connected to a fourth node electrically connected to the n high-side switching elements.

18. A motor drive unit, comprising:

the electric power conversion apparatus of claim 1;

a control circuit to control the electric power conversion apparatus.

* * * * *